United States Patent [19]
Burg

[11] Patent Number: 5,415,120
[45] Date of Patent: May 16, 1995

[54] MULTIPLE HULL AIR RIDE CRAFT

[76] Inventor: Donald E. Burg, 15840 W.W. 84 Ave., Miami, Fla. 33157

[21] Appl. No.: 151,253

[22] Filed: Nov. 12, 1993

Related U.S. Application Data

[63] Continuation-in-part of Ser. No. 737,403, Nov. 1, 1976, abandoned, and a continuation-in-part of Ser. No. 818,303, Jul. 25, 1977, Pat. No. 4,165,703, and a continuation-in-part of Ser. No. 69,771, Aug. 27, 1979, abandoned, and a continuation-in-part of Ser. No. 207,789, Nov. 17, 1980, abandoned, and a continuation-in-part of Ser. No. 269,908, Jun. 3, 1981, Pat. No. 4,392,445, and a continuation-in-part of Ser. No. 289,769, Aug. 3, 1981, abandoned, and a continuation-in-part of Ser. No. 343,287, Jan. 27, 1982, abandoned, and a continuation-in-part of Ser. No. 458,738, Jan. 17, 1983, abandoned, and a continuation-in-part of Ser. No. 465,670, Feb. 10, 1983, abandoned, and a continuation-in-part of Ser. No. 584,728, Feb. 29, 1984, Pat. No. 4,587,918, and a continuation-in-part of Ser. No. 844,529, Mar. 27, 1986, Pat. No. 4,735,164, and a continuation-in-part of Ser. No. 862,300, May 12, 1986, Pat. No. 4,739,719, and a continuation-in-part of Ser. No. 183,588, Apr. 19, 1988, Pat. No. 4,890,564, and a continuation-in-part of Ser. No. 458,575, Dec. 29, 1989, Pat. No. 5,000,107, and a continuation-in-part of Ser. No. 653,724, Feb. 11, 1991, abandoned, and a continuation-in-part of Ser. No. 728,887, Jul. 10, 1991, Pat. No. 5,176,095, and a continuation-in-part of Ser. No. 871,387, Apr. 21, 1992, abandoned.

[51] Int. Cl.6 .................................................. B63B 1/38
[52] U.S. Cl. ...................... 114/67 A; 114/289; 114/290; 180/126
[58] Field of Search .............. 180/126; 114/61, 67 K, 114/67 A, 288, 289, 290, 56

[56] References Cited

U.S. PATENT DOCUMENTS

| | | | |
|---|---|---|---|
| 1,819,216 | 8/1931 | Warner | 114/67 A |
| 3,148,652 | 9/1964 | Canazzi | 114/56 |
| 3,191,572 | 6/1965 | Wilson | 114/67 A |
| 3,476,069 | 11/1969 | Mantle et al. | 114/67 A |
| 3,742,888 | 7/1973 | Crowley | 114/67 A |
| 5,176,095 | 1/1993 | Burg | 180/126 |

Primary Examiner—Sherman Basinger
Attorney, Agent, or Firm—Robert J. Van Der Wall

[57] ABSTRACT

An improved performance marine surface vessel that includes pressurized supporting gas cushions in multiple hulls, normally catamaran-like sidehulls, where such pressurized supporting gas cushions support a majority of boat weight in operation. The preferred embodiment of the invention utilizes long fine pointed bow catamaran-like sidehulls that are in mechanical communication with a connecting hull structure. The long fine sidehulls offer performance advantages over a single large supporting gas cushion. Sidehull gas cushion outer sidewalls are preferably wider and deeper than inner sidewalls which insures minimum resistance coupled with maximum transverse stability in roll. Further, sidehull gas cushion sidewalls optionally have angled to horizontal flatter surfaces forward and then transition to more rounded shapes aft which provides for good pitch stability and minimum hydrodynamic resistance. The invention may include a hull on centerline that adds to stability in rough seas and gives a racy yacht-like appearance. Recesses in the sidehulls may include, at least in part, fixed and/or movable seals. Fixed seals may include inset vented steps to reduce wetted surface area. The recess gas pressurization system may include a controller to control pressures in individual recesses which allows at least some control of boat motions in rough seas. A further feature is the use of vertically oriented vented steps in the sides of the sidehulls to reduce wetted area drag when operating in rough seas. One other feature is the use of air flow turbulence generators on the underside, or wetdeck, of the connecting hull structure to thereby increase static pressure lifting forces acting on the connecting hull structure.

41 Claims, 5 Drawing Sheets

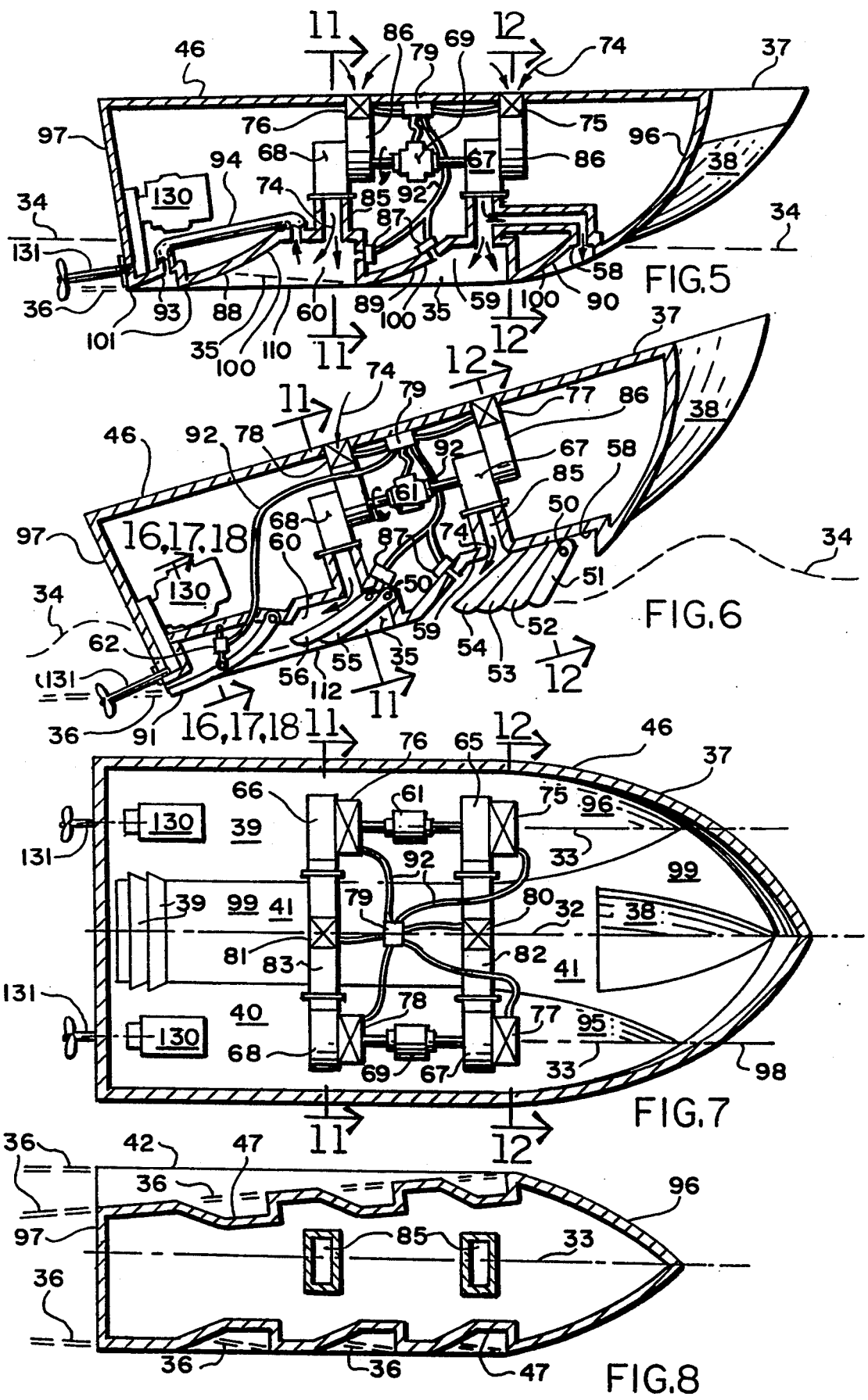

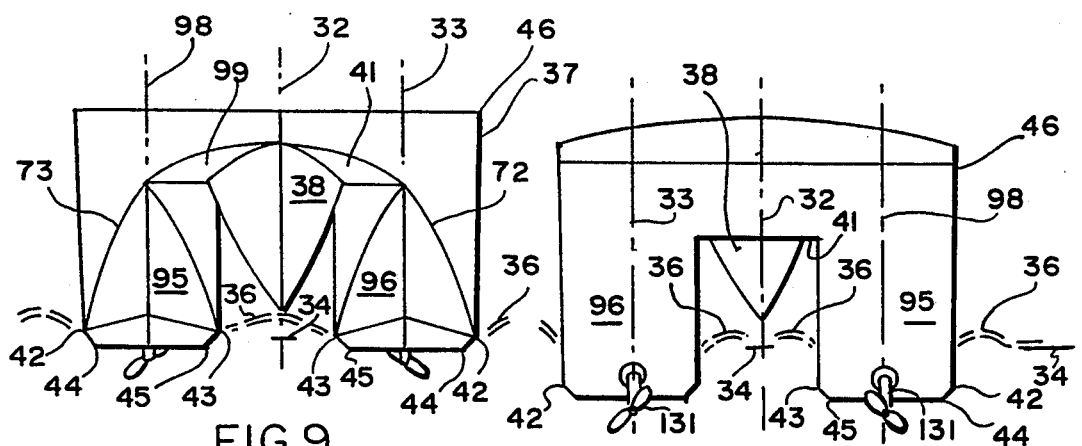
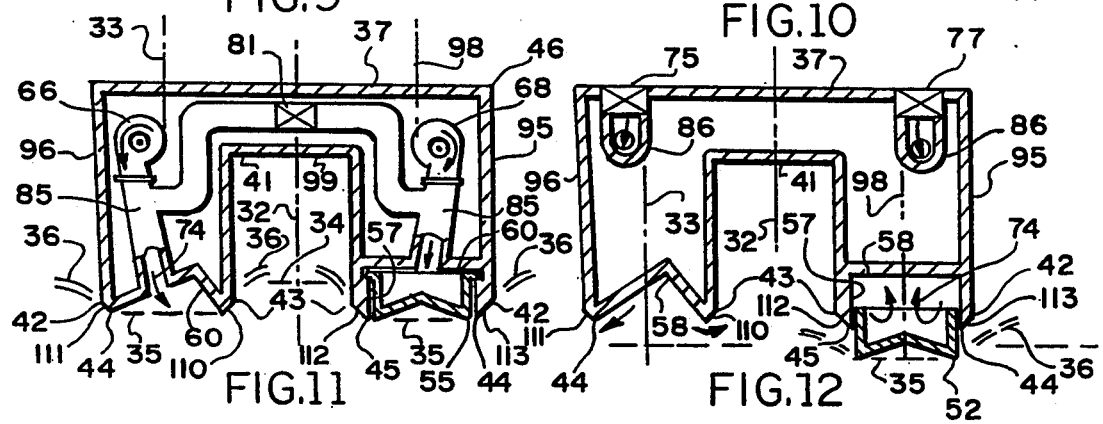
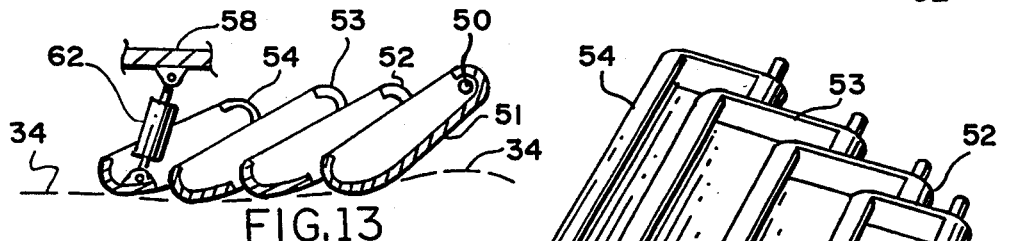
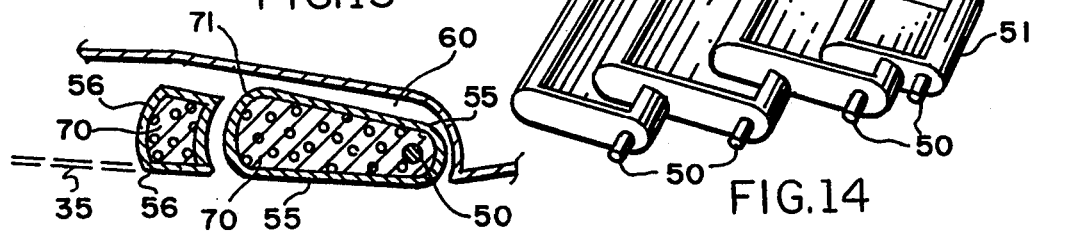
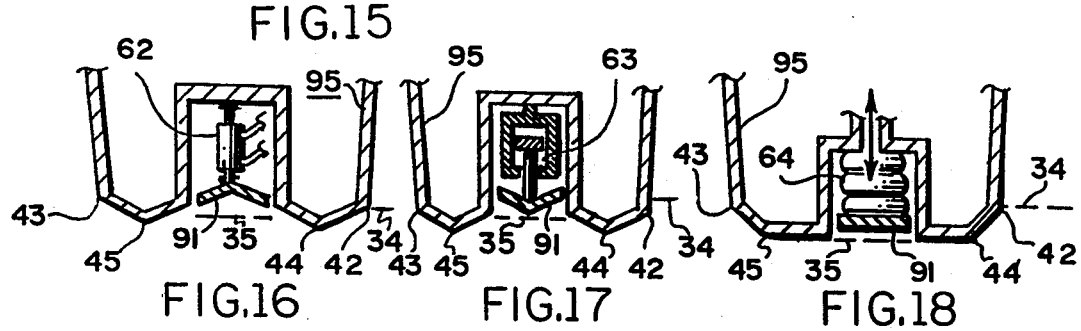

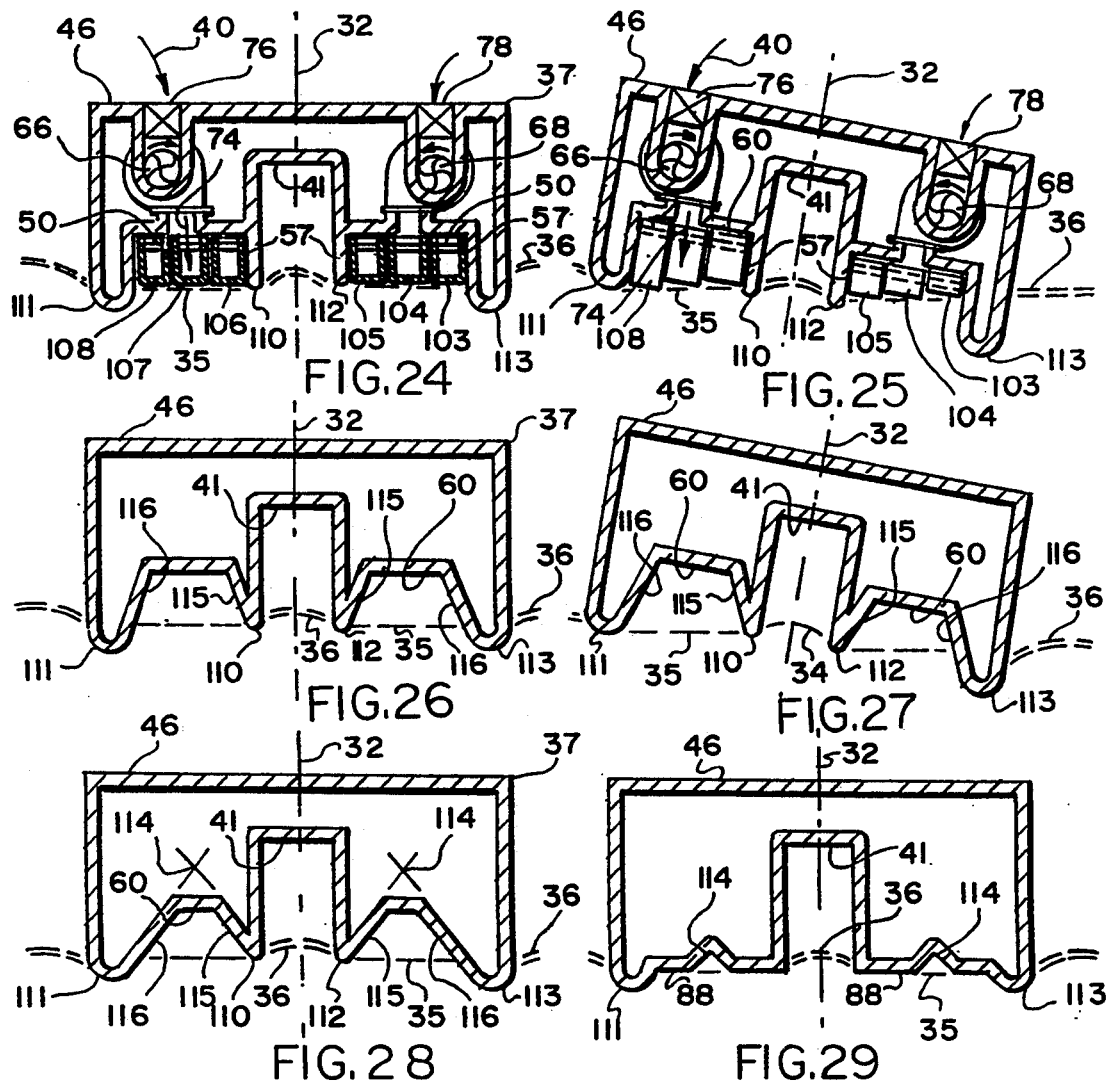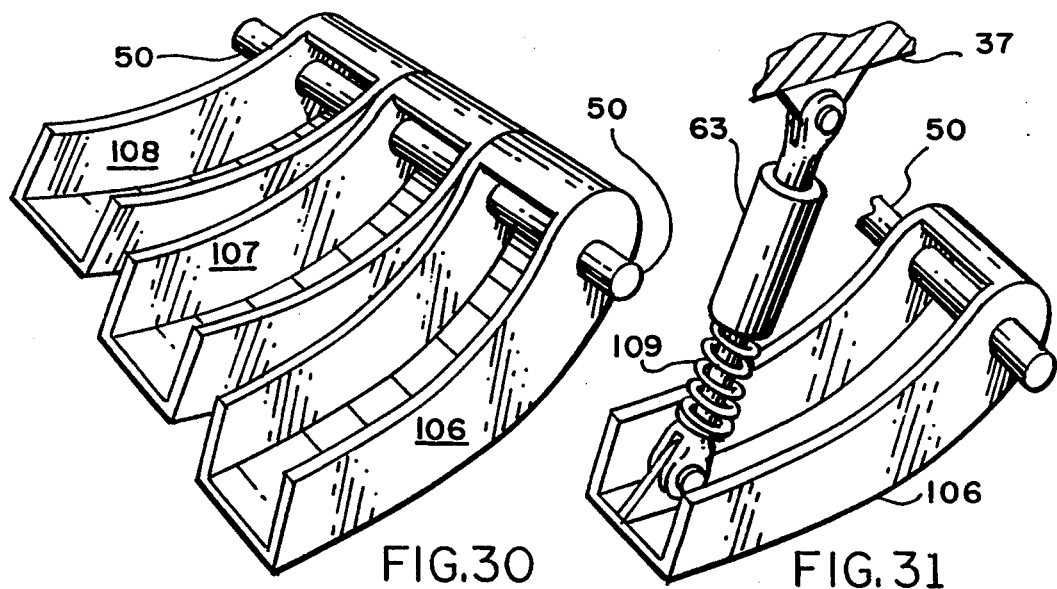

MULTIPLE HULL AIR RIDE CRAFT

CROSS REFERENCE TO OTHER APPLICATIONS

This application is a continuation-in-part to applicant's earlier applications, Ser. No. 737,403, filed Nov. 1, 1976, now abandoned; Ser. No. 818,303, filed Jul. 25, 1977, now U.S. Pat. No. 4,165,703, issued Aug. 28, 1979; Ser. No. 069,771, filed Aug. 27, 1979, now abandoned; Ser. No. 207,789, filed Nov. 17, 1980, now abandoned; Ser. No. 269,908, filed Jun. 3, 1981, now U.S. Pat. No. 4,392,445, issued Jul. 12, 1983; Ser. No. 289,769, filed Aug. 3, 1981, now abandoned; Ser. No. 343,287, filed Jan. 27, 1982, now abandoned: Ser. No. 458,738, filed Jan. 17, 1983, now abandoned; Ser. No. 465,670, filed Feb. 10, 1983, now abandoned; International Application No. PCT/US 83/001067 filed Jul. 11, 1983 now WO 85/00332; Ser. No. 584,728, filed Feb. 29, 1984, now U.S. Pat. No. 4,587,918, issued May 13, 1986; Ser. No. 844,529. filed Mar. 27, 1986, now U.S. Pat. No. 4,735,164, issued Apr. 5, 1988; Ser. No. 862,300, filed May 12, 1986, now U.S. Pat. No. 4,739,719, issued Apr. 26, 1988; Ser. No. 183,588, filed Apr. 19, 1988, now U.S. Pat. No. 4,890,564, issued Jan. 2, 1990; International Application No. PCT/US 89/01421, filed Apr. 6, 1989 now WO 89/10294; Ser. No. 458,575, filed Dec. 29, 1989, now U.S. Pat. No. 5,000,107, issued Mar. 19, 1991; International Application No. PCT/US 91/01002 filed Feb. 11, 1991 now WO 92/13753; Ser. No. 653,724, filed Feb. 11, 1991, now abandoned; Ser. No. 728,887, filed Jul. 10, 1991, now U.S. Pat. No. 5,176,095, issued Jan. 5, 1993; Ser. No. 871,387, filed Apr. 21, 1992; now abandoned; and International Application No. PCT/U.S. 92/05300 filed Jun. 22, 1992 now WO 93/1082.

FIELD OF THE INVENTION

This invention relates to the field of marine vessels made more efficient in operation by the use of a supporting pressurized gas cushion disposed in a recess in the underside of the vessel's hull. The principle emphasis of the instant invention relates to the use of multiple hulls, primarily of catamaran-like configuration for the outboard sidehulls, where such hulls individually incorporate gas pressurized recesses in their undersides to thereby effect a multiple and, in the case of the outboard sidehulls, widely spaced set of pressurized gas cushions. A wave clearing cross deck, referred to as the "wetdeck", is formed between pressurized gas cushion catamaran-like sidehulls. This is done using more or less pointed bow boat shaped sidehulls in the optional configuration. Other items that may be incorporated to improve performance of the instant invention include one or more hulls in addition to the catamaran-like sidehulls, vertically oriented steps in the sidehulls to reduce wetted area drag in rough seas, sidehull and, when used, other hull recess seal members that can be either fixed or movable, and means to regulate gas pressure in at least partially separated recess gas cushions and thereby control pitch, roll, and heave motions of the vessel.

BACKGROUND OF THE INVENTION

This invention is a further improvement to applicant's earlier inventions in this field that are generally entitled "Air Ride Boat Hulls". All of these inventions require the introduction of pressurized gas into a recess in the underside of a boat hull to increase operating speeds and load carrying capabilities and improve stability. The improvements are the result of the pressurized gas cushion supporting some eighty to ninety percent of boat weight in most cases. The efficiency improvements at high speed are mainly the result of a reduction, normally by several orders of magnitude, of wetted area drag compared to a more conventional hull form.

The instant invention offers significant advances over applicant's earlier patents from the standpoint of use of multiple, primarily parallel and widely spaced, hulls. It is to be noted that the definition of multiple hulls is defined to mean two or more hulls in this application. The effect of this is to change and improve vessel stability and resistance and performance characteristics, in many instances, compared to a more generic air cushion supported marine craft such as the Surface Effect Ship (SES). The SES has thin parallel sidehulls that are joined transversely fore and aft by full span flexible seals—the space thus formed is pressurized with air to provide a large lifting force. As such, it can be seen that the generic air cushion supported marine craft has a single rather wide rectangular footprint on the water's surface compared to the two or more widely spaced narrower and finer, Preferably pointed bow shaped, footprints of the instant invent ion.

The widely spaced long and thin air cushion hulls, in combination, have a much reduced low or "hump" speed resistance characteristic than does a single wide air cushion hull. However, at very high speeds a large wide air cushion hull with its single cushion generally has less resistance. That is due in part to the added wetted area resistance of the necessary extra sidewalls on the inboard sides of the separated catamaran-like sidehulls of the instant invention. However, there are certain operational conditions where more than two air cushioned hulls are desirable for the instant invention. This occurs when running a large vessel at sub-"hump" speeds in a trough in the resistance curve of such vessels. It has been calculated that the lower wave resistance of the air cushions of an Air Ride Multiple Hull Craft with more than two hulls can overcome the normal advantage of less wetted area afforded by only two hulls. That is because, for example, in a three or more hulled version each hull has a much higher Length to Beam (L/B) air cushion than a two hulled version. Normally, the higher the L/B of the air cushion the better the air cushion efficiency at sub-"hump" speeds.

Some effort has been made in the instant invention to reduce that wetted area effect by use of new concept vertically oriented steps that are preferably vented by surface air supplied downward along the vertical steps. It is preferable to have the sidewalls taper inward going aft in way of the vertical steps to reduce the drag force due to the impingement of water spray on the steps.

The instant invention accomplishes the preceding, in its optimum configuration, while using essentially boat shaped sidehulls, and where applicable additional hulls, that, in their preferred embodiment, have a generally pointed bow and truncated stern shape as seen in a dynamic waterline plane where the water contacts the sidehull. At least one of the sidehull keels diverges outward aft of the bow and then become substantially parallel over most of its after length. The sidehulls are symmetrical in the preferred embodiment; however, asymmetrical sidehulls can be used. Use of fixed and/or movable seals can also be used in or proximal to the sidehull pressurized gas recesses.

Another embodiment of the instant invent ion uses narrower inboard sidewalls on catamaran-like air cushion sidehulls than outboard sidewalls. The reason for this is that the majority of hull transverse stability moment forces are provided by the outboard sidewalls due to their much greater distance from the vertical centerline plane of the hull. Therefore, it is of limited value from a transverse stability standpoint to have a wide inboard sidewall and use of narrower inboard sidewalls yields less wetted area hull resistance.

Further to reducing hull resistance, my studies have shown that use of a harder or more defined chine forward going a more rounded sidewall shape aft yields advantages. The harder chine forward gives better stability in a seaway while the more rounded sidewall shape aft provides less resistance. The rounded sidewall shape aft is generally in the form of circular arc shapes.

It is also preferred that the lower surfaces of the inboard sidewalls terminate higher in elevation than the outboard sidewalls lower surfaces. The effect of this is to reduce hull resistance since less of the inboard sidewalls are in the water. This is possible because the distance of the inboard sidehull from the vertical centerline plane of the hull is less and therefore it sees less vertical movement during hull rolling.

The U.S. Navy funded some studies in the early eighties of a boat that utilized catamaran-like sidehulls with each sidehull a generic SES. As stated before, the generic SES is a pressurized air cushion vehicle that incorporates full span flexible seals fore and aft (bow and stern) between parallel sidehulls. In the Navy's concept, the twin generic SES sidehulls were separated by and connected to a cross deck or wetdeck structure. Not only were their sidehulls parallel, but each sidehull had sides that were thin and plate-like and ran completely up to the wetdeck. Outward extensions of the wetdeck actually formed the upper surface of the pressurized gas recesses. This can be seen from FIG. 2, page 302, from an article titled: "The Surface Effect Catamaran—Progress in Concept Assessment" by F. W. Wilson, et al, pages 301-311, *Naval Engineer's Journal*, May 1983, published by the American Society of Naval Engineers, Inc., 1452 Duke Street, Alexandria, Va. 22314. That article gives a detailed summary of the Navy's catamaran sidehull air cushion vehicle project. Comparison of the vehicle described in that article and the instant invention clearly shows the significant conceptual improvements and, in most cases, simplifications that the instant invent ion offers over the Navy's concept. For purposes of simplification, the Navy's project will be referred to as SECAT (their acronym made from Surface Effect CATamaran) in the remainder of this document.

SECAT's idea was that each sidehull's flexible bow seals would give to waves and they could pass through the sidehull recess without molestation unless they were of sufficient height to contact the recess wetdeck. While the SECAT's analytical and model studies were encouraging there appears to have been no follow-on efforts on actual full size or prototype vessels. SECAT also requires extra structural weight for the long thin cantilevered sidehull plates and would have very poor off-cushion performance. It would appear that concern for the aforementioned plus the very high, narrow, and high maintenance flexible seals in each sidehull recess with the related tremendous increase in wetted area resistance in high seas, due to the extra vertical movement of the flexible seals on the inboard sides of each sidehull and resulting increases in wetted area, compared to a generic single chamber SES, probably discouraged further efforts.

The instant invention's sidehulls and additional hulls where used, in their preferred embodiments, have Substantially pointed bows that allow the use of shallow recesses since the pointed bows divide an oncoming wave and direct it to either side of a sidehull rather than allowing its full passage intra sidehull's recess. The instant invention's sidehulls have rather boat shaped pointed bows and truncated sterns, as seen in outline in a horizontal waterline cross section of a sidehull, in its preferred embodiment. This compares to the SECAT where each of SECAT's sidehulls have a rectangular footprint on the water surface as can be seen in FIG. 11, page 306, of the preceding referenced SECAT article. Further, the aforementioned new concept vertical steps in the sidehulls of the instant invention will greatly limit the increase of wetted area resistance on the outside or sea surface sides of the sidehulls when operating in heavy seas. Neither of the just mentioned advantages of the instant invention reduce its performance and will, indeed, provide for at least reasonably good conventional catamaran-like hull performance with the blower system off, That is because the relatively shallow gas cushions and optional recess seal members make for much more hull like undersurfaces than did the SECAT'S twin air cushion design. That is because the SECAT'S design used full, to the wetdeck, depth recesses with full depth flexible seals fore and aft. That design used parallel thin sideboards, that extended all the way to the wetdeck, to form each side of the catamaran sidehulls. It can easily be seen that the SECAT'S design must have functioned much like a lilypad with the blowers off.

The use of seals to divide portions of the recess also offer advantages. They reduce the amount of recess surface wetting when operating in heavy seas. This is particularly so when the preferred inverted-V seal design is utilized since such a shape has its lowest point at the sidehull sides thereby directing waves away from recess vertical surfaces downstream of the inverted-V seals. The recess seals also provide fore and aft smaller recesses that can be pressurized differently to help trim the vessel. The differential pressurization is accomplished by use of pressure control valves that are directed by an on-board controller that senses hull orientation and pressures in the recesses.

In the case of use of the separated fore and aft gas cushions in the sidehulls, my studies have shown that a movable seal, that is force biased downwardly by a spring or other force generating member in its preferred configuration, that is positioned between the gas cushions is desirable. This provides for an efficient water following movable seal. The use of the downward force on the seal provides for such instance where the forward gas cushion is pressurized at greater pressure than the aft gas cushion. The reason for need of the movable seal is that the forward and aft ends of the sidehulls follow the wave patterns while the more middle sections of the sidehulls can see rising and lowering wave patterns inside the air cushions.

The instant invention also offers an additional hull disposed inward, and some cases in part forward, of the sidehulls. This offers significant additional advantages. The first is in appearance where a rather yacht-like pointed bow, as seen from topside or in profile, can be realized if an additional hull extends forwardly on centerline. The second is in providing good ride qualities in rough seas in that the additional hull helps to prevent bow pitch down of the boat in heavy seas. The third is that the additional hull(s) helps prevent wetdeck slamming when running in very heavy seas as it tends to lift the forward part of the boat as a large wave is encountered and then directs the wave away from the wetdeck.

Lake, U.S. Pat. No. 1,307,135, uses dual gas cushion floats with the floats supplied with exhaust gas from an engine. Lake's main intent is to make a device to aid in performance of a seaplane, or hydroaeroplane as he calls it, when the seaplane is either waterborne or airborne as can be realized upon examination of lines 96-106, page 2, of his patent which states: "Furthermore, it will be appreciated, that when the hydroaeroplane is in flight through the air, a corresponding entraining action will ensue between the aquafoils and supporting pressures, supplemented of course by the exhaust pressures, and the resulting diminution in frictional resistance, in this instance, will be measurable because of the relatively lighter density of the elastic fluid which is thus introduced between the aquafoils and the air pressure.". This is further shown by lines 22-24, page 2, of Lake which states: The float is shown as supporting a fuselage 8 by struts 9, and aerofoils representing a supporting unit are indicated by 10.". The supporting unit 10 is actually the wing of an aircraft. While his invention can also be applied to marine surface craft, it is obvious that much of the inventive thrust was directed at the seaplane or hydroaeroplane application which led to limited use as a marine surface craft. Applicant's invention can have a distinctive racy yacht-like boat look with a pointed bow and catamaran-like sidehulls that are flush with the boat sides in its preferred embodiment.

Some particular points regarding Lake's invention compared to applicant's instant invention are now noted. The gas cushion in each of Lake's floats are rectangular as seen in a calm sea surface waterline, when the float is pressurized with gas, and has parallel sides 2 and 3 over the length of the gas cushion. It is a preferred arrangement of applicant's invention that gas cushions be narrower, normally at least twenty-five percent, forward than aft which allows for a fine entry bow with little increase in wetted area on the lower surfaces of the bow at the bow portions of the recess. Further, also in the preferred embodiment of applicant's instant invention, a gas cushion bounding side of a catamaran-like sidehull would expand outwardly from its forward portions and then become more parallel over its aft portions. This allows for a finer entry forward coupled with most gas cushion bottom water contacting surface area and best streamlining aft. Further, when operating with the gas cushion pressurized and at high speeds, planing speeds for example, in calm seas the pointed bow portions of Lake's invention would be well clear of the water and the forward water contacting surface would be the transverse aft Section of his forward bow 4 only. Applicant's preferred embodiment has a narrower bow shaped portion in water contact at high and low speeds. For purposes of applicant's instant invention, high speeds are defined as speeds of more than 25 knots.

Lake offers a series of transverse aquafoils 6 separated by spaces 7 across the lower portions of his gas cushions. Since there aquafoils must also serve as aerofoils when his craft is airborne and must further help direct exhaust gas flow out from the underside of the float they are separated and airfoil shaped. Therefore, he does not have separate recesses in a float whereas applicant's instant invention, in its preferred embodiment, utilizes separate recesses in each catamaran-like sidehull which, preferably, can be supplied with gas at different pressures to aid in control of boat motions. Importantly also, Lake's aquafoils 6 are planar over their entire width, as seen in vertical transverse planes of his vehicle, which makes for a hard jarring ride in rough seas as compared to applicant's preferred embodiment angled recess seal surfaces. There are numerous other innovations in applicant's instant invention that offer dramatic improvements over both SECAT and Lake as are presented hereinafter.

Rizzo, U.S. Pat. 4,393,802 offers a monohull with a center pressurized air cushion and with dual outer recess that are open at the aft end with no aft sealing means to restrain pressure in a side gas cushion which is an absolute requirement of applicant's instant invention. Wilson, U.S. Pat. No. 3,191,572; Sundquist, U.S. Pat. No. 3,606,857; and Bredt, U.S. Pat. No. 4,031,841 offer variations of air lubricated multihulls. However, all have air layers that cannot be sealed at their aft ends since they do not have an aft air cushion seal. They cannot therefore seal air pressure in a cavity or recess under a sidehull which is an absolutely essential requirement of the instant invention. They simply use ram or blower pressurized air to lubricate the underside of the sidehulls and/or as a means to accelerate water out an open aft end of the air lubricated underside of a sidehull. Because they have no means to restrain gas cushion pressure in sidehull recesses and therefore cannot support a majority of craft weight with pressurized gas cushions and because of numerous other defining innovations of applicant's instant invention, neither Rizzo, Wilson, Sundquist, or Bredt offer resemblance to applicant's instant invention.

Crowley, U.S. Pat. presents a monohull boat with a series of air cushions disposed underneath. Crowley has a single fixed hull structure bow that connects his air cushions completely from the main deck to the waterline at the front of his boat. He has no distinction of the separated bows at the front of the boat which is a feature of applicant's instant invention. The appearance of Crowley's boat from a bow view is that of a standard monohull boat while applicant's invention has a multi-bow appearance and, as such, a better ride in rough seas as waves can enter between the multiple hulls of the instant invention in its preferred embodiment. There is therefore little resemblance between the instant invention and Crowley basic monohull air cushioned boat hull concept.

Applicant has discussed all of the other related art in his earlier single hull Air Ride boat hull patent applications. The instant invention offers advancements over applicant's earlier inventions as well as over the prior art. These advancements are discussed in some detail in the following sections.

SUMMARY OF THE INVENTION

The object of the instant invention is to offer the advantages of previous Air Ride boat hull inventions coupled with further improvements in stability and performance that are related to use of separated substantially parallel catamaran-like sidehulls and, in some instances, an additional hull(s) disposed between the sidehulls where such sidehulls, and optionally one or more of any additional hulls, contain bounded recesses in their undersides such that restrained pressurized gas cushions can be formed in the hull recesses.

It is a related object of the invention that such restrained pressurized gas cushions be maintained, by artificial pressurization means, at sufficient pressure to support a majority of boat weight.

A further related object of the invention is that the sidehulls and any additional hulls can be substantially boat shaped with an essentially pointed bow shape when viewed in a plane that intersects a calm sea waterline when the boat is underway at high speed.

It is also an object of the invention that the sidehulls and any other hulls can be either symmetrical or asymmetrical.

Another object of the invention is that either one or both of a sidehull's or additional hull's sidewall's water contacting surfaces can diverge to accomplish a widening of the air cushion going from forward to aft.

It is an important related object of the invention that a sidehull's or additional hull's sidewall water contacting surface can diverge outward from forward and become parallel over at least a part of its after portions.

It is a further object of the invention that a sidehull's or additional hull's outer sidewall's water contacting surfaces can be wider than the sidehull's or additional hull's inner sidewall's water contacting surfaces.

It is also an object of the invention that water contacting surfaces of a sidehull's or additional hull's sidewall preferably be more hard chine or flatter forward going to more rounded shapes aft.

A further object of the invention is that a sidehull inner sidewall's lower surfaces be, on average, higher in elevation than the sidehull outer sidewall's lower surfaces.

Another object of the invention is that the sidehulls or additional hull(s) can extend forwardly of the main hull structure.

It is another related object of the invention that the sidehulls and additional hull(s) be separated by a connecting hull structure that is at least mostly clear of the water surface when the boat is in operation.

Another object of the invention is that an additional hull can be utilized, normally on centerline, where such additional hull adds to vessel fore and aft stability and reduces wetdeck wetting especially when the vessel is operating at high speeds in heavy seas.

A related object of the invention is that an additional hull can extend forward of the sidehulls.

It is also an object of the invention that an additional hull can be made with different shapes such as the preferred deep-V, inverted-V, or others.

It is another object of the invention that the sidehulls and any additional hull(s), if used, can be substantially boat shaped at the waterline with an essentially pointed bow and a truncated stern.

Yet another object of the invention is to offer substantially vertical steps that reduce the amount of vertical surface wetted sidehull area when operating in rough seas.

It is a related object of the invention that ambient air is fed downward into the vertical steps.

A further related object of the invention is to slant the vertical steps so that water is directed not only outward from the sidehull but also downward thereby adding lift to the sidehull.

Another important related object of the invention is that the shape of a sidehull and/or any additional hulls can be made wider forward and narrower aft in way of the vertical steps thereby reducing the rearward force of spray impinging on the sidehull steps.

An object of the invention that is related to that just preceding is to have the sidehull or any additional hull(s) full width below the narrowing stepped portion thereby giving a full width gas cushion and hence a full width lifting surface while still offering the advantage of tapered sidehull sides in way of the vertically oriented vented steps.

Yet another object of the invention is to provide an air flow turbulence generator on the underside of the wetdeck to thereby restrict air flow under the wetdeck and as a result cause a buildup of static air pressure lifting force under the wetdeck.

A further object of the invention is to provide movable bow and/or recess seals that are movable in relation to the boat, Yet another object of the invention is to provide a movable bow seal that can be utilized in conjunction with a pointed bow shape forward of the movable bow seal thus allowing for a simple fixed wave piercing bow with its related low cost and attractive appearance.

It is an object of the invention that the movable bow seal concept could include a series of seals or elements with each being able to follow the water surface thus creating an efficient gas seal.

Another object is that the bow seals be able to seal themselves from the side and also that following seals help in the sealing of seals preceding them.

Yet another object of the invention is that the movable bow seals have trailing surfaces that curve or angle to match movement of a following seal thus resulting in good sealing of pressurized gas in the gas cushion.

A related object of the invention is that the movable seals be made of structurally strong materials which is possible since it is not necessary that such movable seals utilize flexible materials for construction.

Yet another advantage of the optional movable seals of the instant invention is that the movable seals can be attached by hinges or other simple means to the hull.

It is also an object of the invention that the optional movable bow seals be made with shaped lower surfaces, such as a preferred shape inverted-V, to provide good Water surface tracking and reduced wave impact loadings.

It is a further object of the invention that secondary bow shaped members can be interspersed in the gas cushion recess to assist in providing hull stability and also help break up waves under the hull when operating in rough seas.

It is a related object of the invention that the secondary bow shaped members can be shaped like inverted-V's with their lower portions located proximal the sidehull's Sides thus adding to hull stability in roll as well as reducing inside of recess wetting downstream of the inverted-V seals.

Another object of the invention is to provide a downwardly force biased movable seal positioned between fore and aft sidehull, and/or additional hull(s) where used, pressurized gas cushions.

It is a related object of the invention that the downwardly force biased movable seal be made up of multiple water contacting ski-like elements.

An object of the invention related to the immediately preceding is to provide for the secondary bow shaped member inside of the recess to be biased, or lower, to the outboard side than the inboard side of the recess thereby adding further to roll stability of the boat.

Further, it is an object that a structurally sound and reliable fixed stern seal be utilized that can optionally incorporate movable stern seal element(s) to aid in gas sealing, controlling of vessel trim, and/or directing water flow to a propulsor that is positioned aft of the movable stern seal element.

Related is the object that the fixed stern seal can have a lower surface that is somewhat more flat than a forward portion of the fixed stern seal thus providing a high efficiency planing surface for the aft end of the boat to ride on.

Yet another related object is to provide a stern seal with a lower surface that has a low wave impact, at least partial, V-shape when seen in operation from a bottom plan or fisheye view.

A related object is to provide for an inset into the stern seal that will reduce the high resistance wetted area of the stern seal.

A further related object is to provide a means to supply pressurized gas to the inset in the stern seal.

A further object of the invention is to have a fixed structural portion of the stern seal extend, in mathematical summation of its parts, across a majority of the width of the recess.

A related object of the invention is to have fixed structural portions of the stern seal, as seen in a vertical transverse plane of the hull, be angled to horizontal over a majority of their width to reduce wave impact forces in rough seas.

It is yet another object of the invention that gas pressure control means can be incorporated that can regulate gas pressure in at least portions of the recesses.

A directly related object of the invention is that regulation of gas pressure in such recess portions can help in maintaining best trim of the vessel in heavy seas.

A further related object of the invention is that a controller be used to control operation of gas pressure control means that in turn controls gas pressures in the recesses.

Yet another related object of the invention is that the just mentioned controller receive as inputs hull orientation and values of pressures in the hull recesses.

The invention will be become better understood upon reference to the drawings and the detailed description of the invention which follow in which:

BRIEF DESCRIPTION OF THE DRAWINGS

FIG. 5 presents a cross sectional view of the port sidehull, as taken through line 5—5 of FIG. 2, that shows drive engine and propulsor, a gas pressurization system including drive motor and blowers, blower inlet control valves, fixed recess seals, and gas vented stern seal. Also shown is a controller that receives inputs from pressure transducer(s) that monitor recess pressures. The controller processes recess pressure information coupled with optional information from a gyrostabilizer, internal to the controller in this instance, to arrive at outputs that direct blower flow control valves that are also shown. The result of this is that pressures in various recess portions can be controlled to thereby dramatically improve pitch, roll, and heave of the boat.

FIG. 6 is a starboard sidehull cross sectional view, as taken through line 6—6 of FIG. 2, that shows similar items to those presented for the port sidehull in FIG. 5 except that the sidehull is pitched bow up in rough seas. Further, the starboard sidehull utilizes movable seals that, in this preferred instance, follow the water surface to provide best gas sealing. It is to be noted that the movable seals need not extend below a keel line of the sidehull and that they can constitute a forward portion of a sidehull. Also shown in FIG. 6 is a controllable movable aft seal member that can not only effect the level of water in the recess but also effect the level of water reaching the surface drive propulsor that is used in this instance.

FIG. 7 presents a top plan view, with the deck removed, of a boat to the instant invention. Shown are the main engines and propulsors, blowers and drive engines, blower flow control valves, blower interconnecting ducts and valves, and controller. Shown also are a top side of the wetdeck, additional hull, and air flow turbulence generators.

FIG. 8 is a cross sectional view of the port sidehull, as taken through line 8—8 of FIG. 4, that shows details of typical vertically oriented air vented steps as seen in a horizontal plane. It is to be noted that in this example the outboard side of the port sidehull tapers inward going aft. That is the preferred embodiment of the sidehull shape of the invention and offers least forward resistance to impinging water spray. Also shown in FIG. 8 are pressurized gas flow ducting.

FIG. 9 presents a bow on view of an Air Ride boat to the preferred version of the invention. this view shows an additional hull in the form of a very deep-V hull on centerline, sidehulls, and the interconnecting wetdeck.

FIG. 10 shows a stern view of an Air Ride boat to the instant invention which also shows the propulsors. Further shown in FIGS. 9 and 10 are the water spray patterns that come off the hull when operating at high speeds in calm seas.

FIG. 11 is a cross sectional view, as taken through line 11—11 of FIGS. 2, 5, 6, and 7 that shows the aft powered blowers, interconnecting duct system and its valve, movable seal in the starboard sidehull and generally inverted-V shape in a port sidehull recess. It is important to note that the invented-V shape shown is biased with more substance on the outboard side of the port sidehull. This biasing adds to overall hull stability in roll since a larger lift force is generated on more outboard surfaces when they are in water contact.

FIG. 12 presents a cross sectional view, as taken through line 12—12 of FIGS. 2, 5, 6, and 7, that shows forward blower air inlets and blower gas flow control valves. Also shown are a forward movable seal member in the starboard sidehull and an inverted-V shape that makes up part of a port sidehull recess surface. Of course, other shapes than inverted-V are usable; however, the inverted-V shape offers advantages in that it appears to offer best rough water ride qualities and also directs water away from inside surfaces of the following recess.

FIG. 13 offers a cross sectional view of the forward movable seals of the starboard sidehull, as taken through line 13—13 of FIG. 2 that shows four forward movable seal elements in extended positions during rough water operation. FIG. 13 shows the general construction and operation of these movable seals. The last of the forward movable seals is controlled by an actuator in this instance.

FIG. 14 presents an isometric view, as taken from above and from inside a recess, of the seals offered in FIG. 13. The optional actuator is not shown in this view.

FIG. 15 is a cross sectional view of the intermediate movable seals of the starboard sidehull, as taken through line 15—15 of FIG. 2 that shows those seals in a retracted position The construction of these seals is different, in this instance, from those presented in FIG. 13. These seals offer a preferred construct ion method that utilizes a closed cell foam core and a rigid outer skin. This preferred seal construction concept is light, strong, buoyant, and resistant to water absorption.

FIG. 16 offers a cross sectional view, as taken through line 16—16 of FIG. 2, of a version of an aft movable seal. In this example the seal positioning is controlled by an actuator such as a fluidic cylinder.

FIG. 17 presents a cross sectional view, as taken through line 17—17 of FIG. 2, of another possible variant of a movable aft seal that utilizes a reactive dash-pot damper or shock absorber to affect movement of the aft movable seal. It is to be noted that a simple spring, not shown, could also be used as a reactive member.

FIG. 18 is a cross sectional view, as taken through line 18—18 of FIG. 2, that shows a preferred embodiment of a movable aft seal that utilizes a simple gas pressure bellows to control the aft seal. The actual water contacting member is in reality a plate like member of fiberglass or other material in the preferred embodiment of the invention.

FIG. 24 presents a transverse cross-sectional view, as taken through line 24—24 of FIG. 20 that shows the aft blowers in each sidehull and intermediate movable seal elements. In this case the hull is running smooth and horizontal in a calm sea and the movable seals are equally positioned. Note that the outer sidewalls have more rounded lower or water contacting surfaces than those shown in FIG. 23. The use of flatter surfaces forward going to more rounded surfaces aft makes for a more stable hull in pitch width less resistance in its after portions in many speed ranges of interest. Note that the sidewall air cushion inner surfaces are substantially vertical and parallel in way of the movable seals in this preferred embodiment.

FIG. 25 illustrates a transverse cross-sectional view, as taken through line 25—25 of FIG. 20, of the same section as that presented in FIG. 24. However, in this case, the hull is in a roll to starboard. As such, the movable seal elements are staggered and rising going from port to starboard as they follow the water surface.

FIG. 26 shows a transverse cross-sectional view, as taken through line 26—26 of FIG. 20. This view illustrates a typical preferred hull transverse cross-section that occurs once aft and clear of the bow sections and any movable seals that might be used.

FIG. 26 presents a transverse cross-sectional view, as taken through line 26—26 of FIG. 20. This is the same view as that presented in FIG. 26 except the hull is in a roll to starboard condition. It is important to realize that the inboard sidewalls of the sidehulls are narrower and also terminate higher on their lower water contacting surfaces than the outboard sidewalls in this preferred embodiment. This results in less resistance from the inboard sidewalls and is possible because, as illustrated in this roll situation, the upper or port side has the lower gas sealing surfaces at about the same elevation. Note also that the water surface below the starboard sidehull gas cushion is lower than on the port sidehull while still sealed. This allows for a higher gas cushion pressure on the lower starboard side and hence a positive roll restoring force moment from the gas cushions.

FIG. 28 is a transverse cross-sectional view, as taken through line 28—28 of FIG. 20 that shows the downward angling of the inner surfaces of the sidehull sidewalls as the stern is approached. This is actually the beginning of the preferred inverted-V fixed stern seal shapes where the inverted-V apex, in this case, is defined by the intersection of extensions of the sidewall inner surfaces. It is preferred that these apexes occur below a deck line of the boat, at least over much of the shaping of the aft seals, as that defines a good final inverted-V shape for good rough sea seal ride qualities.

FIG. 29 presents a transverse cross-sectional view, as taken through line 29—29 of FIG. 20, that shows the shape of fixed stern seals near the aft end of the gas cushions.

FIG. 30 is an isometric view of some typical intermediate movable seal elements and a seal hinge pin. The movable seal elements are at various elevations on their lower surfaces in this illustration as they would be when following an irregular water surface. The downward force elements, shown as springs in earlier FIG. 21, are not shown in FIG. 30 to simplify the illustration.

FIG. 31 shows an isometric illustration of a single movable seal element and a dash pot or shock absorber.

DETAILED DESCRIPTION

With reference to each of the aforementioned figures in turn, and using like numerals to designate similar parts throughout the several views, a preferred embodiment and several alternative embodiments will now be described.

Figure 1:
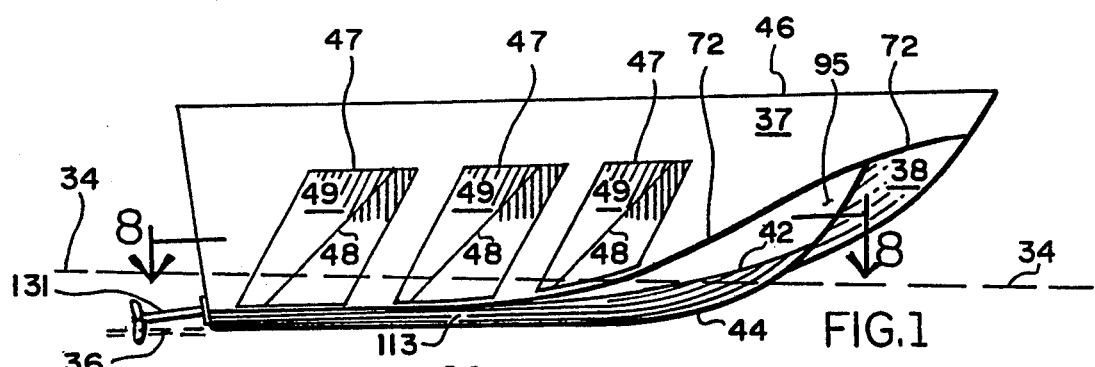
FIG. 1 presents a profile view of a boat hull to the instant invention. This profile view shows a boat that is rather conventional looking, particularly above the waterline, with a pointed bow. It also shows the optional vertically oriented air vented steps in the side of the hull that can be applied to greatly reduce wetting of the side of the boat hulls.

FIG. 1 discloses a profile view of the starboard side of a boat 37 to the instant invention that is running in a calm sea as shown by sea surface waterline 34. Shown is the starboard sidehull 95, starboard sidehull outer sidewall 113, sidehull chine 42, main hull upper chine 72, additional hull 38, deck line 46, transom 97, propulsor 131 (in this case a surface propeller drive), adjacent to the hull water surface 36, and vertically oriented air vented step compartments 47. The vertically oriented ventilated step compartments 47 include an angled step line 48 and a tapered vertically oriented step 49 in these preferred embodiments. The vertically oriented ventilated steps 47 reduce the wetted area of the starboard sidehull 95 as can be Seen by examination of the sea surface waterline 34. This reduction of wetted surface area can be even more pronounced when operating in rough seas.

Figure 2:
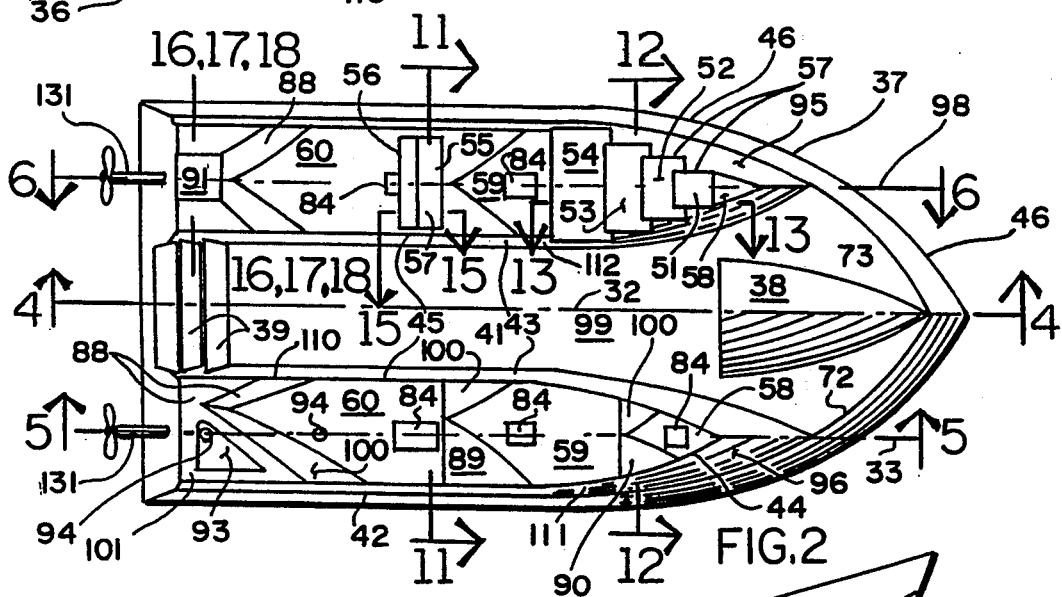
FIG. 2 offers a bottom plan view of a boat to the instant invention with catamaran-like sidehulls connected by a hull structural member that has on its underside a wetdeck, including a turbulence generator near its aft end, and an additional hull forward on centerline in this instance. This particular variant shows fixed inverted-V shaped recess seals in the port sidehull and a combination of movable, relative to the boat hull, seals and fixed seals in the starboard sidehull. It would normally be preferred to utilize the same seal configurations in both sidehulls; however, a combination such as is shown would be quite workable.

FIG. 2 presents a bottom plan view of a boat 37 that shows the connecting hull structure 99 whose underside is the wetdeck 41 which includes an air flow turbulence generator 39. The connecting hull structure 99 is normally in mechanical communication with an additional hull 38, port sidehull 96 and starboard sidehull 95 in the preferred embodiment of the instant invention. The wetdeck 41 is also bounded by the transom 97 and main hull upper chines 72 and 73 in this instance. The additional hull 38 is preferably centered around the boat's vertical centerline plane 32 in this triple hull arrangement; however, more than one additional bow 38 can be used and the additional bow 38 need not be centered around the boat's vertical centerline plane 32. The boat 37 has a vertical centerline plane 32, a port sidehull vertical centerline plane 33, and a starboard sidehull vertical centerline plane 98. Also shown are the deck line 46, propulsors 131, sidehull outer chines 42 and inner chines 43, sidehull outer keels 44 and inner keels 45, port sidehull inner sidewall 110, port sidehull outer sidewall 111, starboard sidehull inner sidewall 112, starboard sidehull outer sidewall 113, pressurized gas supply ducts 84, and sidehull forward recesses 58, intermediate recesses 59, and aft recesses 60. It is to be noted that any number of recesses, from one to many, can be incorporated into either sidehull 95 and 96 and that Other multiple hull members, such as the additional hull 38, can also include pressurized gas recesses (not shown) if desired.

FIG. 2 also shows the port sidehull recess with fixed angled to a preferred inverted-V shape, as seen in a vertical transverse plane of the hull, seals. These fixed seals are forward seal 90, intermediate seal 89, and aft seal 88. Angled seal portions 100, as seen in a vertical transverse plane of the boat, compare to more horizontal lower seal portions 101. The use of more angled surfaces 100 forward gives best ride qualities in rough seas while the more horizontal lower surfaces 101 give best hydrodynamic efficiencies so the combination is warranted. The port aft seal 88 includes an inset 93 that is supplied with pressurized gas from a recess 60 or other source by conduit 94. Supplying the inset 93 with pressurized gas makes a gas layer in the inset 93 and thereby reduces port aft seal 88 wetted area and hence wetted area resistance.

FIG. 2 further presents an optional sealing means in the starboard sidehull 95 that uses movable, in relation to the starboard sidehull 95, seals. These are forward movable seals 51, 52, 53, and 54, intermediate movable seals 55 and 56, and aft movable seal 91. Substantially vertical, or parallel, sidehull inside surfaces 57 are normally used next to the movable seals and sidehull inside surfaces can diverge aft of such parallel sidehull inside surfaces 57 proximal the movable seals 51, 52, 53, 54, 55, and/or 56. Further descriptions of functions of these movable seals is given in following paragraphs; however, their primary intent is to provide better gas sealing than is possible with the fixed seals shown in the port sidehull. The starboard sidehull 95 may be truncated forward and not have a pointed bow as is shown. An optional variation of the instant invention is that a bow of a sidehull could be partially truncated so that there is little or no pointed center bow of a sidehull forward of the movable seal 51.

Figure 3:
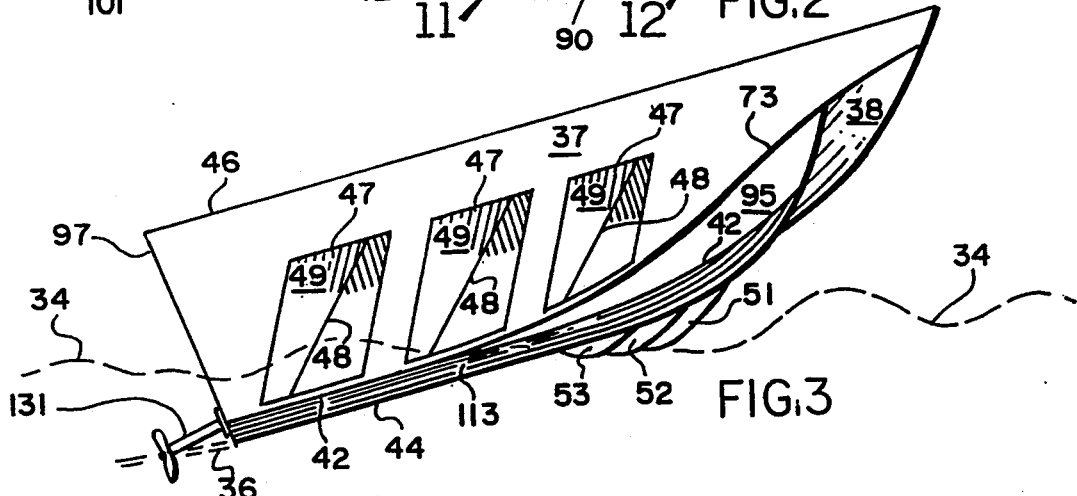
FIG. 3 provides a starboard profile view of the hull of FIG. 2 when said hull is operating in heavy seas with its bow pitched upward. It is to be noted that the movable seals forward in the starboard sidehull have extended below the sidehull to aid in sealing of the pressurized gas in a starboard sidehull recess.

FIG. 3 shows a starboard side profile view of the boat 37 when operating in heavy seas as seen by sea surface waterline 34. The center hull 38 is pitched up in this instance. It can be seen that the starboard sidehull 95 forward movable Seals 51, 52 and 53 have extended downward below a keel line 44 to aid in sealing of pressurized gas. Also shown are the starboard sidehull chine 42, starboard sidehull outer sidewall 113, main hull upper chine 73, deck line 46, adjacent to hull water surface 36, transom 97, and propulsor 131. Vertically oriented air vented step compartments 47 which include an angled step line 48, and tapered vertically oriented steps 49 are also shown. Other configurations of vertically oriented ventilated steps are, of course, possible.

Figure 4:
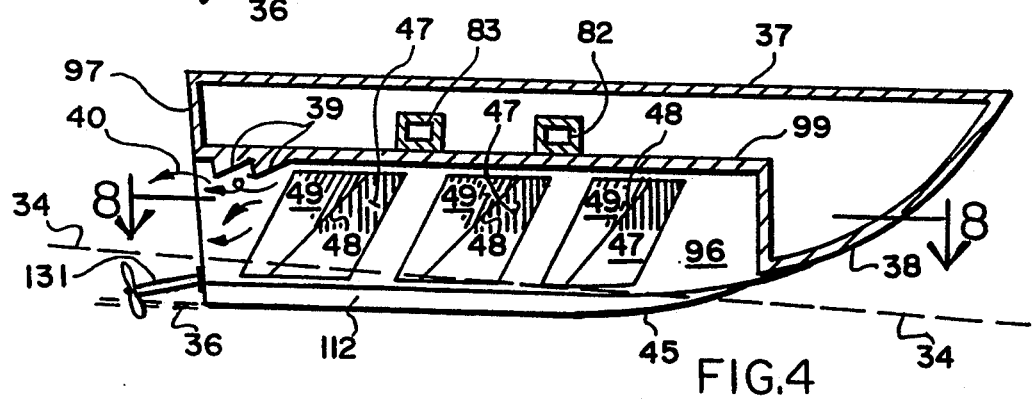
FIG. 4 is a centerline cross sectional view, as taken through line 4—4 of FIG. 2, that shows vertically oriented air vented steps in the inside surfaces of the port sidehull. Also shown are a forward center bow, wetdeck, air flow turbulence generator, and pressurized gas connecting passageways.

FIG. 4 presents a cross sectional view, as taken through line 4—4 of FIG. 2, that shows the elevation of the wetdeck 41 aft of the center hull 38 where the center hull helps prevent wave slamming into the wetdeck 41. The wetdeck 41 is actually the underside of the connecting hull structure 99. It is important to note the air flow turbulence generator 39 and its effect on air flow, as shown by air flow arrows 40. The generated turbulence reduces air flow area and thereby increases air static pressure forward of the air flow turbulence generator 39 thus creating an added lift force acting on the wetdeck 41. The effect of this, of course, is to increase overall efficiency of the boat 37. Shown also are the vertically oriented ventilated step compartments 47, step lines 48, and vertically oriented steps 49 that are on the inside of the starboard sidehull 95. Further shown in FIG. 4 are the starboard sidehull inner sidewall 112, sea surface waterline 34, propulsor 131, transom 97, and gas pressurization cross flow ducting forward 82 and aft 83.

FIG. 5 shows a cross sectional view, as taken through line 5—5 of FIG. 2 that shows workings of the port sidehull 96 gas pressurization system and other features. The gas pressurization system shown here includes a gas pressurization device or blower drive motor 69, forward blower 67, forward gas flow control valve 75, gas inlet duct 86 gas discharge duct 85, aft blower 68, and aft flow control valve 76. The forward blower 67 supplies pressurized gas to the forward recess 58 and intermediate recess 59 in this instance and the aft blower supplies pressurized gas to the aft recess 60.

It is possible to regulate gas pressures in the recesses 58, 59, 60 by use of the gas flow control valves 75 and 76. The operation of these valves is normally directed by a controller 79 that receives as inputs recess pressure readings from pressure transducers 87 through connectors 92. The controller 79 would also normally receive hull orientation data (pitch, roll, and yaw values) from a gyrostabilizer (not shown) and g-force acceleration values from an accelerometer (not shown) that would normally be mounted internal to the controller 79. The controller 79 processes said information and in turn sends out directing signals to the gas flow control valves 75 and 76. Controller function is such that if a pitch down by the bow condition is encountered that the controller 79 would open forward gas flow control valve 75 fully and restrict flow through the aft gas flow control valve 76. Such action would increase the gas pressure in forward recess 58 and intermediate recess 59 and decrease gas pressure in aft recess 60 thereby returning the boat 37 to a more normal trim. It is to be noted that gas flow control valves can be located between the blowers 67 and 68 and the recesses 58, 59, and 60 if desired. Also, gas flow control valves can be positioned to vent pressure from the recesses 58, 59, and 60 to accomplish the same thing although such an arrangement would not be as efficient as it would waste blower power.

Also shown in FIG. 5 is an inset 93 into a fixed stern seal 88 more horizontal lower surface 101 that is supplied with pressurized gas from aft recess 60. A fixed intermediate seal 89 and fixed forward seal 90 are also shown. More angled seal surfaces 100 are also shown. Gas flow is shown by gas flow arrows 74. Other items shown in FIG. 5 include a sea surface waterline 34, adjacent to hull water surface 36, recess surface waterline 35, propulsor 131, main drive engine 130, port sidehull sidewall 110, sheer or deck line 46, and center bow 38

FIG. 6 presents a cross sectional view, as taken through line 6—6 of FIG. 2, of the starboard sidehull 95 which includes starboard sidehull inner sidewall 112. For purposes of illustration, the boat 37 is shown in a bow pitched up orientation that can occur when running in a rough sea as is show by sea surface waterline 34. The advantages of using movable forward seals 51, 52, 53, and 54 here are made clear as such seals restrict gas flow leakage from intermediate recess 59 when the hull is clear of the water. It can be seen that, in this example, the forward recess 58 is clear of the sea surface 34 and therefore loses its pressurized gas until reentry into the water occurs. Also shown are intermediate movable seals 55 and 56 which are riding on recess waterline 35 in this example. It is to be noted that movable seal hinge pins 50 are shown in movable seals 51 and 55 only in this sidehull centerline view Refer to FIG. 14 for a more detailed description of the workings of the movable seals and their hinge pins. An aft movable seal 91 that is controlled in positioning by actuator 62 is also shown. The aft movable seal 91 can help control the level of water in the aft recess 60 and can also aid in direction of water flow to the surface propeller propulsor 131 in this instance.

FIG. 6 also shows the gas pressurization and control system. This includes a blower drive motor 61, forward blower 67, forward gas flow control valve 77, aft blower 68, aft gas flow control valve 78, inlet gas flow ducting 86, outlet gas flow ducting 85, gas flow arrows 74, pressure transducers 87, controller 79, and connectors 92. The operation and function of this gas pressurization system is basically the same as that described under FIG. 5 so the reader is referred to that preceding description. However, FIG. 6 adds that the controller 79 can also direct movement of a movable seal such as aft movable seal 91 by directing operation of actuator 62. Further shown in FIG. 6 are a main drive motor 130, center bow 38, and deck line 46.

FIG. 7 is a top plan view of the inventive boat 37 with the deck removed. Shown, from the topside, are the starboard sidehull 95, port sidehull 96, wetdeck 41, air flow turbulence generator 39, center hull 38, connecting hull structure 99, deck line 46, transom 97, propulsors 131, and main drive engines 130. Also shown are the port sidehull vertical centerline plane 33, starboard sidehull vertical centerline plane 98, and the boat vertical centerline plane 32. It is to be noted that the center bow 38 does not have to extend forward of the sidehulls 95 and 96 and that the sidehulls 95 and 96 can actually extend forward of the additional hull 38. Further, an additional hull 38 can be positioned proximal an aft portion of the wetdeck 41 if desired.

FIG. 7 also presents a topside view of a preferred gas pressurization system layout. In this system, the port side blowers 65 and 66 are driven by port side blower motor 61 with gas flow to the blowers controlled by gas flow valves 75 and 76. Starboard side blowers 67 and 68 are driven by blower drive motor 69 and flow to the blowers is controlled by gas flow control valves 77 and 78. There are also interconnecting ducts 82 and 83 that insure that pressurized gas is available to the port sidehull 96 in the event of failure of the port side blower motor 61 or vise versa. There would normally be valves 80 and 81 placed in the interconnecting ducts 82 and 83. Operation of the gas flow control valves 75, 76, 78, 79, 82, and 83 is orchestrated by a controller 79 through connectors 92.

FIG. 8 presents a cross sectional view of the port sidehull, as taken through line 8—8 of FIG. 4, that shows operation of the vertically oriented air vented step compartments 47 similar to those shown in profile in FIGS. 1, 3, and 4. These step compartments 47 noticeably reduce the wetted area of a sidehull or an additional hull for that matter and hence reduce the overall wetted area resistance of the hull. It is to be noted that the inboard side (lower side in FIG. 8) of the port sidehull is substantially parallel to the vertical centerline plane 33 of the port sidehull in way of the vertically oriented air vented step compartments 47 while the outboard side (upper side in FIG. 8) tapers inward toward the vertical centerline plane 33 as it goes aft toward the transom 97. There is good reason for tapering the sides inward. The reason is that this either reduces or eliminates the rearward resistant force caused by impingement of water, as shown by horizontal plane adjacent to the hull water surfaces 36, from preceding vertically oriented steps 49 onto following vertically oriented steps 49. Of course, vertically oriented step compartments 47 and/or the inward tapering of a side can be done on either or both sides of a sidehull and can also be applied to the center bow of other areas if applicable.

Examination of FIG. 8 also shows that the outer chine 42 remains substantially parallel to the inner chine 43, both are substantially parallel to the vertical centerline plane 33 in the preferred embodiment of the invention. Examination of FIGS. 1, 3, and 4 shows that the vertically oriented air vented step compartments 47 actually stop at or above the chines 42 and 43 in the preferred embodiment of the instant invent ion. This al lows for a wider more efficient gas cushion and/or hull structure footprint on the water surface. Also shown in FIG. 8 are the angled step lines 48 and gas flow ducts 85.

FIG. 9 presents a bow view of a boat 37 to the preferred embodiment of the instant invention. Shown are the deck line 46, starboard sidehull 95, port sidehull 96, additional hull 38 on centerline in this instance, connecting hull structure 99, wetdeck 41, hull upper chines 72, 73, sidehull outer and inner chines 42 and 43, sidehull outer and inner keels 44 and 45, adjacent to hull water surface 36, sea surface waterlines 34, vertical centerline plane of the boat 32, port sidehull vertical centerline plane 33, and starboard sidehull vertical centerline plane 98. As can be seen from FIG. 9, the instant invention offers a very high wave clearing distance from the sea surface 34 to the wetdeck 41.

FIG. 10 provides a stern view of the preferred embodiment of the instant invention. The same items that are listed under FIG. 9 immediately preceding are shown in FIG. 10 so that nomenclature will not be repeated here and the reader is referred to the preceding paragraphs. FIG. 10 also shows typical propulsors 131.

FIG. 11 presents a cross sectional view, as taken through line 11—11 of FIGS. 2, 5, 6, and 7, that shows a typical cross section as taken through the aft blowers 66 and 68, Shown are the blower discharge gas flow ducts 85, interconnecting gas flow ducts 83, interconnecting valve 81, and gas flow arrows 74. Also shown are the sea surface waterline 34, recess waterline 35, adjacent to hull water surface 56, port sidehull 96, port sidehull inner sidewall 110, port sidehull outer sidewall 111, starboard sidehull 95, starboard sidehull inner sidewall 112, starboard sidehull outer sidewall 113, connecting hull structure 99, wetdeck 41, sidehull outer chines 42, sidehull inner chines 43, sidehull outer keels 44, sidehull inner keels 45, sidehull aft recesses 60, and deck line 46.

FIG. 11 also shows the starboard sidehull 95 having a movable seal member 55 that has an inverted-V shape on its underside. An intermediate movable seal 55 would normally operate between substantially parallel or vertical inside surfaces 57 as are shown in the starboard sidehull 95. It is normally desirable to have some shape to the underside of a movable seal member, over at least part of its length, to provide best ride qualities in rough seas. Examination of the port sidehull 96 shows a preferred inverted-V shape to the upper surfaces of the aft recess 60. In this preferred embodiment, the recess surface is biased toward having more material on the outboard side than the inboard side. That is actually done on purpose since such biasing gives more lifting forces, when in water contact, outboard to the boat which adds to roll stability (i.e., lifting forces are further outboard from the boat's vertical centerline plane 32 resulting in a greater restoring roll moment). Also shown in FIG. 11 are the port sidehull vertical centerline plane 33, starboard sidehull vertical centerline plane 98, port sidehull inner sidewall 111, port sidehull outer sidewall 112, starboard sidehull inner sidewall 111, and starboard sidewall outer sidewall 113.

FIG. 12 presents a cross sectional view, as taken through line 12—12 of FIGS. 2, 5, 6, and 7, that shows a section taken through the forward gas flow control valves 75 and 77. Shown also are gas inlet flow ducts 86, gas flow arrows 74, starboard sidehull 95, port sidehull 96, interconnecting hull structure 99, wetdeck 41, deck line 46, sidehull outer chines 42, sidehull inner chines 43, sidehull outer keels 44, sidehull inner chines 45, sea surface waterline 34, recess waterline 35, adjacent to hull water surface 36, forward movable seal member 35, forward recesses 58, boat vertical centerline plane 32, port sidehull vertical centerline plane 33, and starboard sidehull vertical centerline plane 98. FIG. 12 shows operation in rough seas with the port sidehull 96 recess 58 clear of the water and therefore vented of pressurized gas while the starboard sidehull 95 recess retains gas pressure since its movable seal 52 extends downward below the keels 44 and 45 and thus at least partially seals against gas leakage. A forward movable seal 52 would, in the preferred embodiment, function between substantially parallel inside surfaces 57 of a sidehull as are shown in this starboard sidehull 95.

FIG. 12 also shows a biasing of the upper surfaces of recess 58 in the port sidehull 96 in a similar manner as that shown in FIG. 11 so the same reasoning for doing so is followed here as was given in the preceding discussion of FIG. 11. Note that the outward biasing of recess surfaces is not necessary for function of the invention and that symmetrical recess surfaces or, indeed, biasing of recess surfaces toward the inboard sides of the recesses can also be utilized. It is given as a definition of this invention that recess and/or fixed seal surfaces are considered to have an inverted-V shape so long as they intersect, either directly as shown in the port sidehull 96 of FIGS. 11 and 12 or as extensions of sidehull surfaces so long as such intersection occurs below a deck line 46 of the boat 37. Further, though preferred, it is not necessary that sidehull sides be symmetrical about their vertical centerline plane for the instant invention to function.

It is important to note from observation of FIGS. 5, 6, 11, and 12 that average recess depth (distance above sidehull keels 44 and 45) is significantly less than the depth of the wetdeck 41 above the sidehull keels 44 and 45. This is a very important characteristic of the instant invention as compared to the SECAT, described under the preceding BACKGROUND OF THE INVENTION section of this document, where the depth of the wetdeck and the depth of the recess are the same. The SECAT utilizes full depth flexible seals fore and aft in each sidehull recess in order to allow waves to pass through essentially unmolested so long as they are less than wetdeck height. The preferred embodiment of the instant invention parts the waves with a pointed ship like bow at the forward end of each sidehull and thereby directs them away from the recess. Therefore, the instant invention can utilize average recess depths that are only half or less of wetdeck depth. Actually, twenty-five percent of wetdeck depth is considered a reasonable and workable number in most cases for the instant invent ion. The advantages of the shallower recesses of the instant invention are several, they include: 1) shallower draft with the blowers off, 2) an inherently stronger and lighter structure, and 3) better ride and handling characteristics with the blowers off.

FIG. 13 is a cross sectional view, as taken through line 13—13 of FIG. 2, that shows the starboard sidehull 95 forward movable seals 51, 52, 53, and 54 in their extended downward position and in contact with the sea surface waterline 34. These forward movable seals 51, 52, 53, and 54 are attached to the sidehull recess 58 structure by hinge pins 50 in this instance. Only the most forward movable seal 51 shows the hinge pins 50 as the other hinge pins 50 do not pass through the sidehull centerline in this configuration. Operational control of the aftermost forward movable seal 54 is shown being accomplished by an actuator 62 in this case although and actuator is not necessary for function. It is also possible to use spring biased systems, dashpots, etc. (not shown) to provide restoring forces to one or all of the movable seals.

FIG. 14 presents an isometric topside view of the forward movable seals 51, 52, 53, and 54 of FIG. 13 but in their retracted position. This clearly shows that, in this preferred embodiment of the instant invention, the movable seals not only overlap fore and aft but also overlap on their sides which is the preferred situation as it prevents gas flow leakage sideways from a recess when the recess is clear of the water surface. FIG. 14 also shows best attachment means in the form of movable seal hinge pins 50. It is to be noted that the hinge pins 50 do not extend through movable seals 52, 53, and 54 as such would preclude the movement of movable seals 52, 53, and 54 in this instance.

FIG. 15 presents a cross sectional view, as taken through line 15—15 of FIG. 2, that shows the intermediate movable seals 55 and 56 disposed in aft recess 60. In this case the movable seals 55 and 56 are following the recess waterline 35 and the movable seals 55 and 56 are retracted. Also shown is a movable seal hinge pin 50. The method of construction of these aft movable seals 55 and 56 involves a closed cell foam filler 70, and skin covering 71. This method of construction provides a very light weight and strong movable seal structure that is impervious to moisture since, in the preferred version, a closed cell plastic foam is used for the filler 70. This method of construction would preferably be applied to manufacture of all movable seals; however, other means of seal construction, including use of flexible seal materials could be utilized.

FIG. 16 is a cross sectional view, as taken through line 16 of FIGS. 2 and 6, that shows an actuator 62 used to position an aft movable seal 91 in the starboard sidehull 95. It is to be noted that some shape is provided in this particular version of the aft movable seal 91. Also shown in FIG. 16 are the sidehull chines 42 and 43 sidehull keels 44 and 45, recess waterline 35, and adjacent to hull water surface 36.

FIG. 17 presents a cross sectional view, as taken through line 17—17 of FIGS. 2 and 6, where items shown include an optional dash-pot damper or shock absorber 63, starboard sidehull 95 aft movable seal 91, sidehull chines 42, sidehull keels recess waterline 35, and adjacent to hull water surface 36. Again, some shape has been added to the underside of the aft movable seal 91 to reduce water impact loadings in rough seas. It is to be noted that a simple spring (not shown) or other force biasing means could be used in conjunction with or in place of the shock absorbing dash-pot 63 shown.

FIG. 18 is a cross sectional view, as taken through line 18—18 of FIGS. 2 and 6, that shows the preferred embodiment gas spring bellows 64 means of positioning the movable aft seal member 91 in starboard sidehull 95. The advantage of using the gas spring is: 1) pressurized gas is already available on board the boat, 2) the gas bellows not only acts as a shock absorbing member but also does the positioning of the movable aft seal, and 3) positioning of the movable aft seal 91 can easily be controlled using outputs from the controller presented in FIGS. 5, 6, and 7 to regulate a gas pressure valve (not shown) that regulates pressure in the gas bellows 64. Also shown in FIG. 18 are the sidehull chines 42 and 43, sidehull keels 44 and 45, gas flow arrow 74, recess waterline 35, and adjacent to hull water surface 36.

Figure 19:
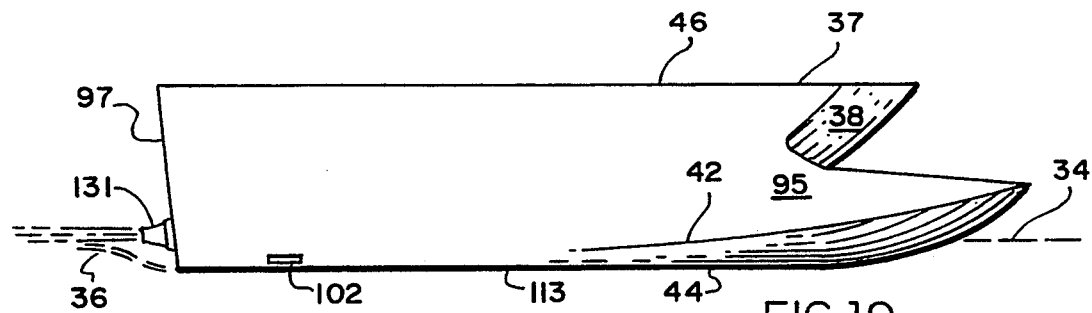
FIG. 19 offers a profile view of the instant invention with severely elongated forwardly extending sidehull bows. This offers the advantage of longer more efficient sidehulls and better rough sea ride qualities since the sidehull bows can actually run through a wave rather than over a wave.

FIG. 19 is a starboard side profile view of a boat or craft 37 of the instant invention with severely elongated forwardly extending sidehulls as shown by starboard sidehull 95. Shown are the deck line 46, optional additional hull 38 on centerline in this instance, sidehull chine 42, sidehull keel 44, starboard sidehull outer sidewall 113, waterjet inlet 102, waterjet propulsor 131, transom 97, sea surface waterline 34, and adjacent to hull water surface 36. Note that the sidehull chine 42, normally referred to as a hard chine, terminates about midship. That is because, in this embodiment of the invention, the forward flatter surfaces of the hard chine sidehull outer sidewall 113 blend into a smoother more rounded surface as they approach midship. This approach yields good stability forward at the bow and minimum resistance aft.

Figure 20:
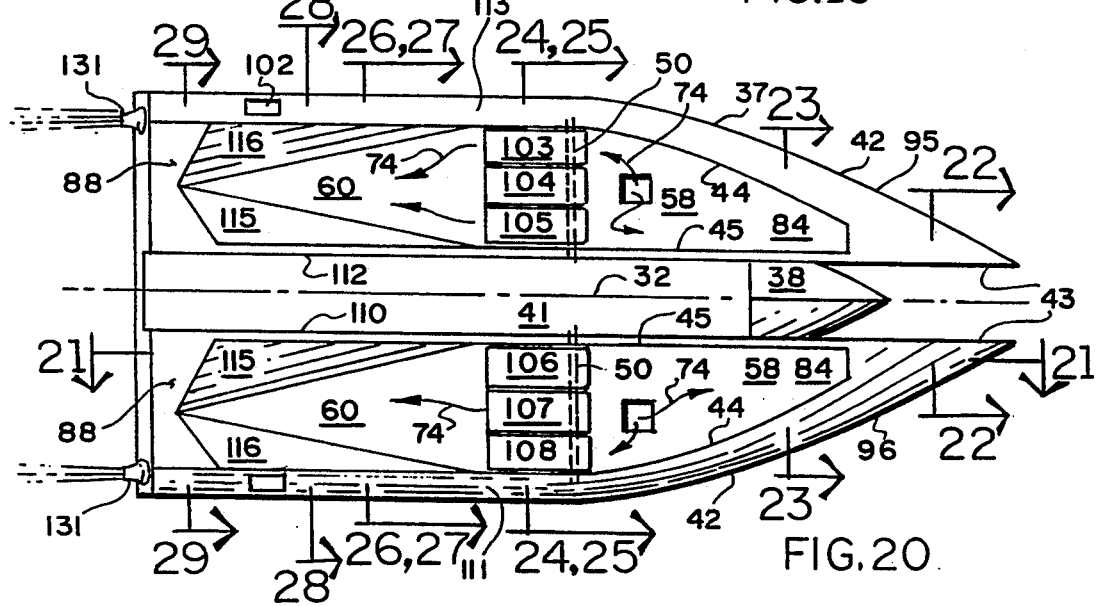
FIG. 20 shows a bottom plan view of the version of the instant invention that was presented in FIG. 19. In this instance the sidehulls and the gas cushions are asymmetrical. Note the movable seal elements that are positioned between forward and aft gas cushions in each sidehull.

FIG. 20 presents a bottom plan or fisheye view of the boat or craft 37 of FIG. 19. Both the port sidehull 96 and starboard sidehull 95 have forward recesses 58 and aft recesses 60 as separated by movable seal members 103 through 108 that are restrained by hinge pins 50. Pressurized gas is injected into the forward recesses 58 through gas discharge openings 84 with gas flow arrows 74 showing direction of gas flow. Sidehull gas cushion aft seal lower surfaces 88 are led by angled surfaces 115 and 116. Sidehull inner chines 43 and inner keels 45 bound the starboard sidehull inner sidewall 112 and the port sidehull outer sidewall 113. The chines blend out going aft of midship in this preferred embodiment since the sidewalls go from flat to rounded going aft. The same situation applies to the port sidehull inner sidewall 110 and outer sidewall 111.

Also shown in FIG. 20 are water jet inlets 102, waterjet propulsors 131, transom 97, additional hull 38, and connecting wetdeck. It to be noted that FIG. 20 presents asymmetrical sidehull and air cushion configurations with substantially straight port and starboard sidehull inner sidewalls 110 and 112. While the symmetrical sidehull bow concept, as shown in FIG. 2 earlier, is preferred, any manner of symmetrical or asymmetrical sidehull shape if usable. That is because the symmetrical, or partially symmetrical, sidehull shape deflects part of a wave to each side of the point of a sidehull bow while the asymmetrical sidehull presented in FIG. 20 deflects all of a wave to the outside. Thus the symmetrical sidehull gives the best ride qualities in rough seas.

Figure 21:
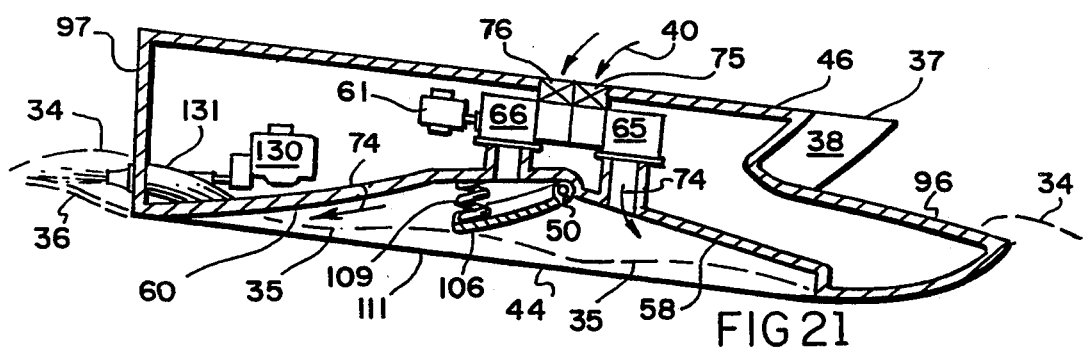
FIG. 21 presents a cross-sectional view, as taken through line 21—21 of FIG. 20, that shows the port sidehull. In this illustration, the pointed sidehull has entered a wave rather than riding over it which makes for a smoother ride. With the boat in a pitch down attitude as shown, the forward gas cushion would be automatically pressurized more than the aft gas cushion in order to correct to a horizontal attitude. Illustrated are blowers that pressurize forward and aft gas cushions and their drive engine, movable gas cushion intermediate seal that is positioned between forward and aft gas cushions and follows the water wave surface in the gas cushion, movable seal downward force mechanism which in this case is a simple spring, and a waterjet propulsor and its drive engine.

FIG. 21 is a cross sectional view, as taken through line 21—21 of FIG. 20, of the port sidehull 96 of the inventive craft 37. In this instance the bow of the sidehull is pitched downward and into a wave on the sea surface 34. As such, the port forward ride control valve 75 that supplies the port forward blower 65 would be automatically fully opened and the port aft ride control valve 76 that supplies the port aft blower 66 at least partially closed. That procedure provides maximum pressure to the forward recess 58 gas cushion and minimum pressure to the aft recess 60 gas cushion thus restoring the hull 37 to a more horizontal attitude.

It is preferred that movable seal elements, such as movable seal element 106 shown, that ride or plane on the air cushion water surface 35 be positioned between sidehull forward and aft recess 58, 60 air cushions. It is normally necessary that a way to force the movable seal elements downward, such as spring 109, be used to insure that the seal elements stay in place when the forward recess 58 gas cushion is at a higher pressure than the aft recess 60 gas cushion. It is to be noted also that additional gas cushion recesses can be used in either sidehull if desired.

Also shown in FIG. 21 are a water jet propulsor 131, propulsor drive engine 130, blower drive engine 61, movable seal hinge pin 50, adjacent to hull waterline 35, transom 97, air flow arrows 40, gas flow arrows 74, forward center bow 38 and port sidehull outer sidewall 111, hull vertical centerline plane 32, and hull deck line 46.

Figure 22:
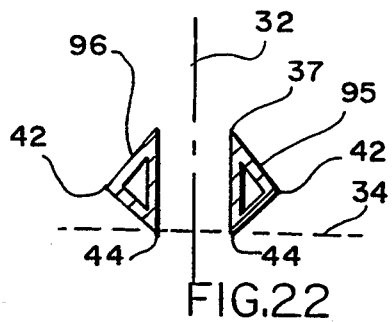
FIG. 22 is a transverse cross-sectional view, as taken through line 22—22 of FIG. 20, that shows a portion of the catamaran sidehulls forward of the main hull. Note that the sidehull outer surfaces have a steeper angle, to horizontal, on their upper portions than their lower portions in this preferred embodiment. The reason for this is to cause an automatic pitch restoring or pitch up force moment on the bows of the sidehulls since the smaller angled lower surfaces will have more lifting force.

FIG. 22 is a transverse cross sectional view, as taken through line 22—22 of FIG. 20, that shows shape of the port sidehull 95 and the starboard sidehull 96 at that forward section. Shown are the sidehull keels 44 and chines 42 and a hull vertical centerline plane 32. It can be seen that the angle to horizontal of the lower surfaces are less than that of the upper surfaces. This provides for a greater lifting force than submerging force which helps for restoration of a horizontal attitude after the craft 37 pitches down by the bow.

Figure 23:
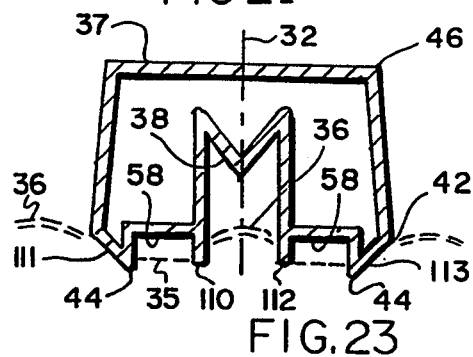
FIG. 23 shows a transverse cross-sectional view, as taken through line 23—23 of FIG. 20, that illustrates hull shape in the area of an optional additional hull positioned at the front end of a connecting wetdeck. Note that sidehull outer sidewalls have hard chine or relatively flat lower surfaces here. Sidehull inner sidewalls are purposely made very narrow for minimum resistance.

FIG. 23 presents a cross sectional view, as taken through line 23—23 of FIG. 20, that shows hull 37 shape forward including an optional additional hull 38 positioned forward of the sidehull connecting wetdeck. Note that these forward portions of the port and starboard sidehull outer sidewalls 111, 113 have hard outer chines 42 and relatively flat surfaces that connect to the sidehull outer keels 44 in this preferred embodiment. The port and starboard sidehull inner sidewalls 110, 112 are very narrow and preferably substantially water slicing like a knife blade in order to impart minimum resistance. Other items shown in FIG. 23 are adjacent to the hull water surfaces 36, air cushion water surfaces 35, hull vertical centerline plane 32 sidehull forward recesses 58, and hull deck line 37.

FIG. 24 is a transverse cross sectional view, as taken through line 24—24 of FIG. 20, that illustrates the port and starboard aft blowers 66, 68 and how they supply pressurized gas to the back side of movable seals 103 through 108. The movable seals 103 through 108 are normally attached by hinge pins 50 to the hull 37. Air enters, as shown by air flow arrows 40, the port and starboard flow control valves 76, 78 and then is pressurized by aft blowers 66, 68 and discharged as indicated by gas flow arrows 74. Since the craft 37 is shown running level on a smooth sea surface in this example, the movable seals 103 through 108 are level and riding on the gas cushion water surfaces 35. There are normally substantially vertical adjacent to movable seal surfaces 57 on the hull. Other items shown in FIG. 24 include adjacent to hull water surfaces 36, hull vertical centerline plane 32, wetdeck 41, and hull deck line 46.

With further reference to FIG. 24, it is important to note that the port and starboard sidehull sidewalls 111, 113 have, preferably, become more rounded in shape on their lower portions than in the more forward sections illustrated by FIGS. 22 and 23. This approach of going from flatter angled or hard chine sidewall surfaces forward to more rounded surfaces aft provides good pitch stability forward coupled with best hydrodynamic efficiencies aft. It is also to be noted that the port and starboard sidehull's outer sidewalls 111, 113 are rather wider and deeper than the port and starboard sidehull's inner sidewalls 110, 112. This gives highest transverse stability and minimum resistance.

FIG. 25 is also a transverse cross sectional view of the hull, taken through line 25—25 of FIG. 20, as was FIG. 24. However, in the instance of FIG. 25, the craft 37 is in a roll to starboard. As such, movable seals 103 through 108 are angled as they follow the gas cushion water surface 35. It is preferred that movable seals rather than fixed seals, as were shown in the port sidehull of FIGS. 2 and 5 for example, be positioned between sidehull gas cushions as they will follow the sidehull inner or gas cushion water surfaces 35 whereas the fixed seals cannot. Other items shown in FIG. 25 are the same as listed under the just preceding detailed description of FIG. 24 so they will not be repeated here.

FIG. 26 presents a hull 37 transverse cross sectional view, as taken through line 26—26 of FIG. 20. This view illustrates a typical preferred hull transverse cross-section that occurs once aft and clear of the bow sections and any intermediate movable seals such as were shown in FIGS. 24 and 25. In the preferred case of a sidehull having only forward and aft gas cushions, it is desirable that a movable seal be positioned at about the middle of the waterline length of a sidehull or slightly forward of said middle of the waterline length.

It is important to realize that the port and starboard sidehull inner sidewalls 110, 112 are narrower and also terminate higher on their lower water contacting surfaces than the port and starboard outer sidewalls 111, 113. This provides for minimum hydrodynamic drag coupled with maximum stability in roll. This effect is further discussed in the description of PIG. 27 which follows.

It is to be noted that the sidehull sidewall inner surfaces 115 and outer surfaces 116 are now angling inward in this preferred version of the instant invention. Further shown in FIG. 26 are the hull vertical centerline plane 32, hull deck line 46, adjacent the hull water surface 26, gas cushion water surface 35, aft recesses 60, wetdeck 41, port and starboard sidehull inner sidewalls 110, 112, and port and starboard sidehull outer sidewalls 111, 113. Further, using FIG. 26 as a typical example of hulls, as seen in a vertical transverse plane, it can be realized that it would be easy to have an additional hull or hulls (not shown) disposed between the catamaran-like sidehulls. In such instance, said additional hull(s) could have a recess for a gas cushion similar to the recesses in the catamaran-like sidehulls shown. The additional hull would preferably be of the same width as the sidehulls but with sides that are similar in shape to the inner sidewalls of the catamaran-like sidehulls. The total beam of the boat, in the illustration being discussed, would be about fifty percent greater than beam of the boat illustrated in FIG. 26. There are certain situations where having additional hulls with supporting gas cushions to the two catamaran-like sidehulls has decided advantages. This applies mainly to larger ships that cruise at sub-"hump" speeds where having three or more hulls with higher Length to Beam (L/B) gas cushions, than that available from two hulls, offers less gas cushion wave resistance over a wider speed range at sub-"hump" speeds. This reduction in gas cushion wave resistance can many times be greater than the added wetted area resistance of the added sidewalls of an additional hull(s).

FIG. 27 is a transverse cross sectional view, as taken through line 26—26 of FIG. 20. This is the same view as that presented in FIG. 26 except the craft or hull 37 is in a roll to starboard. Upon examination of FIG. 27, it can be realized that the port recess gas cushion water surface 35 is restrained by substantially even height port sidehull inner and outer sidewalls 110 and 111 in this roll condition. It is also important to note that the starboard sidehull gas cushion water surface 35 is lower in elevation and therefore at a higher pressure providing a maximum roll correcting lifting moment from the starboard side which is due to the higher starboard sidehull gas cushion pressure. Other items shown in FIG. 27 are the same as listed in the preceding description of FIG. 26 so they will not be repeated here.

FIG. 28 presents a transverse cross sectional view, as taken through line 28—28 of FIG. 20, that is taken further aft in the craft 37 than were FIGS. 26 and 27 preceding. This shows the early development of the preferred inverted-V stern seal. Note the more extreme angling to horizontal of the recess inner and outer angled surfaces 115, 116. Note also that the extension of these surfaces 115, 116 upward results in their meeting in an apex of the most desired inverted-V shape. It is considered a definition of this invention that the meeting of such angled recess surfaces 115, 116 at the apex 114 to form an inverted-V, either directly or in an extension as shown here, is an inverted-V shape. It is also a desirable feature that this apex occur below a deck line 46 of the hull 37. Also shown in FIG. 28 are the port and starboard sidehull inner sidewalls 110, 112, port and starboard sidehull outer sidewalls 111, 113, wetdeck 41, gas cushion waterline 35, and adjacent to hull waterline 36.

FIG. 29 is another transverse cross sectional view of the craft 37, as taken through line 29—29 of FIG. 20, that shows a section of the gas recess stern seals. It can be seen that they have developed into almost full span horizontal flat surfaces 88. There is still a small inverted-V section that meets at apexs 114. In the optimum low resistance configuration, this goes to a full width substantially flat seal surface 88 further aft as can be noted from examination of FIG. 20. It is also desirable, from a minimum high speed resistance standpoint, that the port and starboard sidehull inner sidewalls 110, 112 blend into the seal surface 88 in this area. Also shown in FIG. 29 are the hull vertical centerline plane 32, port and starboard sidehull outer sidewalls 111, 113, wetdeck 41, deckline 46, adjacent to hull waterlines 36, and gas cushion waterlines FIG. 30 presents an isometric view of some typical intermediate movable seal elements 106, 107, 108 and a seal hinge pine 50. In this instance, the movable seal elements are at various elevations on their lower surfaces as they would be when following an irregular water surface. The downward force elements, shown as springs in earlier FIG. 21, are not shown to simplify the illustration presented here in FIG.

FIG. 31 is an isometric illustration that shows a single movable seal elements 106 and hinge pin 50 that is force biased and damped by a spring 109 and dash pot or shock absorber 63 that are attached to hull 37. While the shock absorber 63 and spring 109, either singularly or in combination as shown, are a good means to generate an additional downward force on the movable seal element 106, other means may be used. These include, but are not limited to, the force generating systems shown in preceding FIGS. 16, 17, and 18.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an improved boat having supporting gas cushions disposed in catamaran-like sidehulls with said catamaran-like sidehulls in mechanical communication with connecting hull structure, and said supporting gas cushions supplied with pressurized gas by gas pressurization means, the improvement comprising:

said catamaran-like sidehulls having recesses in their undersides for restraining at least a part of the pressurized supporting gas cushions, an aft portion of each of said recesses comprising, at least in part, a gas restraining recess aft seal member, said gas pressurization means being adapted to pressurize said supporting gas cushions at sufficient pressure to support a majority of boat weight, said catamaran-like sidehulls being, at least in part, individually boat shaped with substantially more narrow bows than aft sections where said boat shape is defined by an intersection of said catamaran-like sidehulls and a calm sea surface waterline, and at least one of said catamaran-like sidehulls, as seen in an intersection of said catamaran-like sidehull and a calm sea surface waterline, enlarges in width asymmetrically going aft from its forward portions.

2. The improved boat of claim 1 wherein at least one of said catamaran-like sidehull recesses, as seen in an intersection of said catamaran-like sidehull recess and a calm sea surface waterline, enlarges in width asymmetrically going aft from its forward portions.

3. The improved boat of claim 1 wherein said asymmetrically enlarging recess becomes substantially more constant in width over at least portions of an aft section of said catamaran-like sidehull.

4. The improved boat of claim 1 wherein said asymmetrically enlarging recess enlarges in width by at least twenty-five percent going aft from its forward portions.

5. The improved boat of claim 1 which further comprises an additional hull disposed, at least partially, between said sidehulls and in mechanical communication with said connecting hull structure.

6. The improved boat of claim 1 wherein said aft seal member is substantially rigid and said substantially rigid aft seal member's underside, when viewed in at least one vertical transverse plane of the boat, contains surfaces that are angled to horizontal.

7. The improved boat of claim 6 wherein said substantially rigid aft seal member extends over a majority of catamaran-like sidehull recess width.

8. The improved boat of claim 6 wherein said substantially rigid aft seal member, as seen in a vertical transverse plane of the boat, has an inverted-V shape.

9. The improved boat of claim 1 which further comprises vertically oriented vented steps in an outer side surface of at least one of said catamaran-like sidehulls.

10. The improved boat of claim 9 wherein at least a part of said catamaran-like sidehull's outer side surface, as viewed in a horizontal plane of said boat, is closer to a vertical centerline plane of said catamaran-like sidehull over an aft portion than a more forward portion.

11. The improved boat of claim 1 which further comprises a movable seal disposed, at least partially, in one of said catamaran-like sidehull recesses, said movable seal being movable in relation to the boat.

12. The improved boat of claim 1 wherein said recess in each of the catamaran-like sidehulls includes first and second recesses separated, at least in part, by recess seal members.

13. The improved boat of claim 12 wherein the gas pressurization means is capable of supplying gas at different pressures to the first and the second recesses.

14. The improved boat of claim 1 wherein, when seen in a vertical transverse plane of the boat, a sidehull's inner sidewall is narrower than its outer sidewall.

15. The improved boat of claim 1 wherein, when seen in a vertical transverse plane of the boat, inner sidewalls of said sidehulls terminate higher on their lower water contacting surfaces than outer sidewalls of said sidehulls.

16. In an improved boat having supporting gas cushions disposed in catamaran-like sidehulls with said catamaran-like sidehulls in mechanical communication with connecting hull structure, said supporting gas cushions supplied with pressurized gas by gas pressurization means, and said supporting gas cushions pressurized at sufficient pressure to support a majority of boat weight, the improvement comprising:

said catamaran-like sidehulls being at least in part, individually boat shaped with substantially more narrow bows than aft sections where said boat shape is defined by an intersection of said catamaran-like sidehulls and a calm sea surface waterline, said catamaran-like sidehulls having recesses in their under sides for restraining at least part of said pressurized supporting gas cushions, end recesses bounded, at least in part, by inner and outer sidewalls where, as seen in a vertical transverse plane of the boat, said outer sidewall is wider than the inner sidewall, and wherein at least one of said catamaran-like sidehull recesses enlarges going aft from its forward portions.

17. The improved boat of claim 16 wherein said catamaran-like sidehull recess, after enlarging, then becomes more constant in width over at least part of its aft portions.

18. The improved boat of claim 16 which further comprises substantially rigid seal members disposed, at least partially, proximal said catamaran-like sidehull recesses and said substantially rigid seal members' undersides, when viewed in at least one vertical transverse plane of the boat, contain surfaces that are angled to horizontal over a majority of said seal members' width.

19. The improved boat of claim 18 wherein at least one of said substantially rigid seal member extends over a majority of catamaran-like sidehull recess width.

20. The improved boat of claim 18 wherein at least one of the substantially rigid seal members, as seen in a vertical transverse plane of the boat, has an inverted-V shape.

21. The improved boat of claim 16 wherein at least one of said catamaran-like sidehull's recesses enlarges asymmetrically going aft from its forward portions.

22. The improved boat of claim 16 which further comprises an additional hull disposed, at least partially, between said sidehulls and in mechanical communication with said connecting hull structure.

23. The improved boat of claim 16 which further comprises vertically oriented vented steps in an outer side surface of at least one of said catamaran-like sidehulls.

24. The improved boat of claim 23 wherein at least a part of said catamaran-like sidehull's outer side surface, as viewed in a horizontal plane of said boat, is closer to a vertical centerline plane of said catamaran-like sidehull over an aft portion than a more forward portion.

25. The improved boat of claim 16 which further comprises a movable seal disposed, at least partially, in one of said catamaran-like sidehull recesses, said movable seal being movable in relation to the boat.

26. The improved boat of claim 16 wherein said recesses in each of the catamaran-like sidehulls includes first and second recesses separated, at least in part, by recess seal members.

27. The improved boat of claim 26 wherein the gas pressurization means is capable of supplying gas at different pressures to the first and the second recesses.

28. The improved boat of claim 16 wherein, when seen in a vertical transverse plane of the boat, the inner sidewalls terminate higher on their lower water contacting surfaces than the outer sidewalls.

29. In an improved boat having catamaran-like sidehulls with said catamaran-like sidehulls in mechanical communication with a connecting hull structure, the improvement comprising:

said catamaran-like sidehulls being, at least in part, individually boat shaped with substantially more narrow bows than aft sections where said boat shape is defined by an intersection of said catamaran-like sidehulls and a calm sea surface waterline, an additional hull member with said hull member disposed, at least partially, between the catamaran-like sidehulls, a recess in each catamaran-like sidehull and the additional hull member, with said recesses at least partially restraining pressurized supporting gas cushions, said supporting gas cushions supplied with pressurized gas by gas pressurization means, and said gas pressurization means being adapted to pressurize said gas cushions at a sufficient pressure that the gas cushions support a majority of boat weight, and wherein at least one of said catamaran-like sidehull recesses, as seen in an intersection of said catamaran-like sidehull and a calm sea surface waterline, enlarges in width going aft from its forward portions.

30. The improved boat of claim 29 which further comprises a second additional hull member at least partially disposed between the catamaran-like sidehulls.

31. The improved boat of claim 29 wherein at least one of said catamaran-like sidehull recesses, as seen in an intersection of said catamaran-like sidehull and a calm sea surface waterline, enlarges asymmetrically going aft from its forward portions.

32. The improved boat of claim 29 which further comprises a substantially rigid seal member disposed, at least partially, in one of said recesses.

33. The improved boat of claim 32 wherein said substantially rigid seal member's underside, when viewed in a vertical transverse plane of the boat, contains surfaces that are angled to horizontal.

34. The improved boat of claim 32 wherein said substantially rigid seal member extends over a majority of recess width.

35. The improved boat of claim 32 which further comprises vertically oriented vented steps in an outer side surface of at least one of said catamaran-like sidehulls.

36. The improved boat of claim 35 therein at least part of said catamaran-like sidehull's outer side surface, as viewed in a horizontal plane of said boat, is closer to a vertical centerline plane of said catamaran-like sidehull over an aft portion than a more forward portion.

37. The improved boat of claim 29 which further comprises a movable seal disposed, at least partially, in one of said catamaran-like sidehull recesses, said movable seal being movable in relation to the boat.

38. The improved boat of claim 29 wherein said recess in each of the catamaran-like sidehulls includes first and second recesses separated, at least in part, by recess seal members.

39. The improved boat of claim 38 wherein the gas pressurization means is capable of supplying gas at different pressures to the first and the second recesses.

40. The improved boat of claim 29 wherein, when seen in a vertical transverse plane of the boat, a sidehull's inner sidewall is narrower than its outer sidewall.

41. The improved boat of claim 29 wherein, when seen in a vertical transverse plane of the boat, inner sidewalls of said sidehulls terminate higher on their lower water contacting surfaces than outer sidewalls of said sidehulls.

* * * * *